United States Patent
Baum et al.

(10) Patent No.: US 7,170,905 B1
(45) Date of Patent: *Jan. 30, 2007

(54) VERTICAL SERVICES INTEGRATION ENABLED CONTENT DISTRIBUTION MECHANISMS

(75) Inventors: Robert T. Baum, Gaithersburg, MD (US); Eric A. Voit, Bethesda, MD (US)

(73) Assignee: Verizon Communications Inc., New York, NY (US)

( * ) Notice: Subject to any disclaimer, the term of this patent is extended or adjusted under 35 U.S.C. 154(b) by 330 days.

This patent is subject to a terminal disclaimer.

(21) Appl. No.: 09/835,649

(22) Filed: Apr. 17, 2001

Related U.S. Application Data

(63) Continuation-in-part of application No. 09/635,695, filed on Aug. 10, 2000.

(51) Int. Cl.
*H04J 3/22* (2006.01)

(52) U.S. Cl. ........................ 370/467; 370/401

(58) Field of Classification Search ............... 370/394, 370/395, 397, 399, 401, 412, 465, 466, 467, 370/470, 474
See application file for complete search history.

(56) References Cited

U.S. PATENT DOCUMENTS

| | | | |
|---|---|---|---|
| 5,247,347 A | 9/1993 | Litteral et al. | |
| 5,341,474 A | 8/1994 | Gelman et al. | |
| 5,410,343 A | 4/1995 | Coddington et al. | |
| 5,550,863 A | 8/1996 | Yurt et al. | |
| 5,568,181 A * | 10/1996 | Greenwood et al. | 725/92 |
| 5,600,632 A | 2/1997 | Schulman | |
| 5,621,728 A | 4/1997 | Lightfoot et al. | |
| 5,712,906 A | 1/1998 | Grady et al. | |
| 5,790,548 A | 8/1998 | Sistanizadeh et al. | |
| 5,812,786 A | 9/1998 | Seazholtz et al. | |
| 5,850,218 A * | 12/1998 | LaJoie et al. | 725/45 |
| 5,905,781 A | 5/1999 | McHale et al. | |
| 5,915,008 A * | 6/1999 | Dulman | 379/201 |
| 5,917,820 A | 6/1999 | Rekhter | |
| 5,920,701 A * | 7/1999 | Miller et al. | 395/200.58 |
| 5,958,016 A | 9/1999 | Chang et al. | |
| 6,028,846 A | 2/2000 | Cain | |

(Continued)

FOREIGN PATENT DOCUMENTS

GB 0748142 12/1998

OTHER PUBLICATIONS

"UBR+: Improviding Performance of TCP over ATM-UBR service", by Rohit Goyal et al., Jun. 8-12, 1997, pp. 1-12.

*Primary Examiner*—Huy D. Vu
*Assistant Examiner*—Toan D. Nguyen

(57) ABSTRACT

The invention relates to an enhanced ADSL Data Network (ADN) with vertical services capabilities. In general, vertical services capabilities are data services offered directly from a central office to an end user, without compromising the integrity of the user's guaranteed bit rate to the Internet through the ADN. One such vertical service is content downloadable at a high data rate from a content server located in or proximate to a central office that serves the end user. The content of the local server is updated and upgraded periodically and systematically from a central content server that distributes content to a number of remote central offices. The content is distributed between the central content server and the respective local content servers using available bandwidth, that is to say bandwidth on at least certain network links that is unused by subscriber traffic.

33 Claims, 11 Drawing Sheets

U.S. PATENT DOCUMENTS

| | | | |
|---|---|---|---|
| 6,078,582 A * | 6/2000 | Curry et al. | 370/356 |
| 6,081,517 A | 6/2000 | Liu et al. | |
| 6,097,720 A * | 8/2000 | Araujo et al. | 370/355 |
| 6,108,350 A * | 8/2000 | Araujo et al. | 370/467 |
| 6,118,785 A * | 9/2000 | Araujo et al. | 370/401 |
| 6,181,715 B1 * | 1/2001 | Phillips et al. | 370/493 |
| 6,185,187 B1 * | 2/2001 | Ghanwani et al. | 370/232 |
| 6,189,008 B1 * | 2/2001 | Easty et al. | 707/10 |
| 6,266,395 B1 * | 7/2001 | Liu et al. | 379/27 |
| 6,301,229 B1 | 10/2001 | Araujo et al. | |
| 6,307,839 B1 * | 10/2001 | Gerszberg et al. | 370/235 |
| 6,363,065 B1 | 3/2002 | Thornton et al. | |
| 6,388,990 B1 | 5/2002 | Wetzel | |
| 6,452,925 B1 | 9/2002 | Sistanizadeh et al. | |
| 6,483,805 B1 * | 11/2002 | Davies et al. | 370/235 |
| 6,580,727 B1 | 6/2003 | Yim et al. | |
| 6,584,074 B1 | 6/2003 | Vasamsetti et al. | |
| 6,636,505 B1 | 10/2003 | Wang et al. | |
| 6,643,253 B1 | 11/2003 | Smith | |
| 6,654,914 B1 | 11/2003 | Kaffine et al. | |
| 6,775,271 B1 * | 8/2004 | Johnson et al. | 370/352 |
| 6,904,054 B1 | 6/2005 | Baum et al. | |
| 7,042,880 B1 | 5/2006 | Voit et al. | |

* cited by examiner

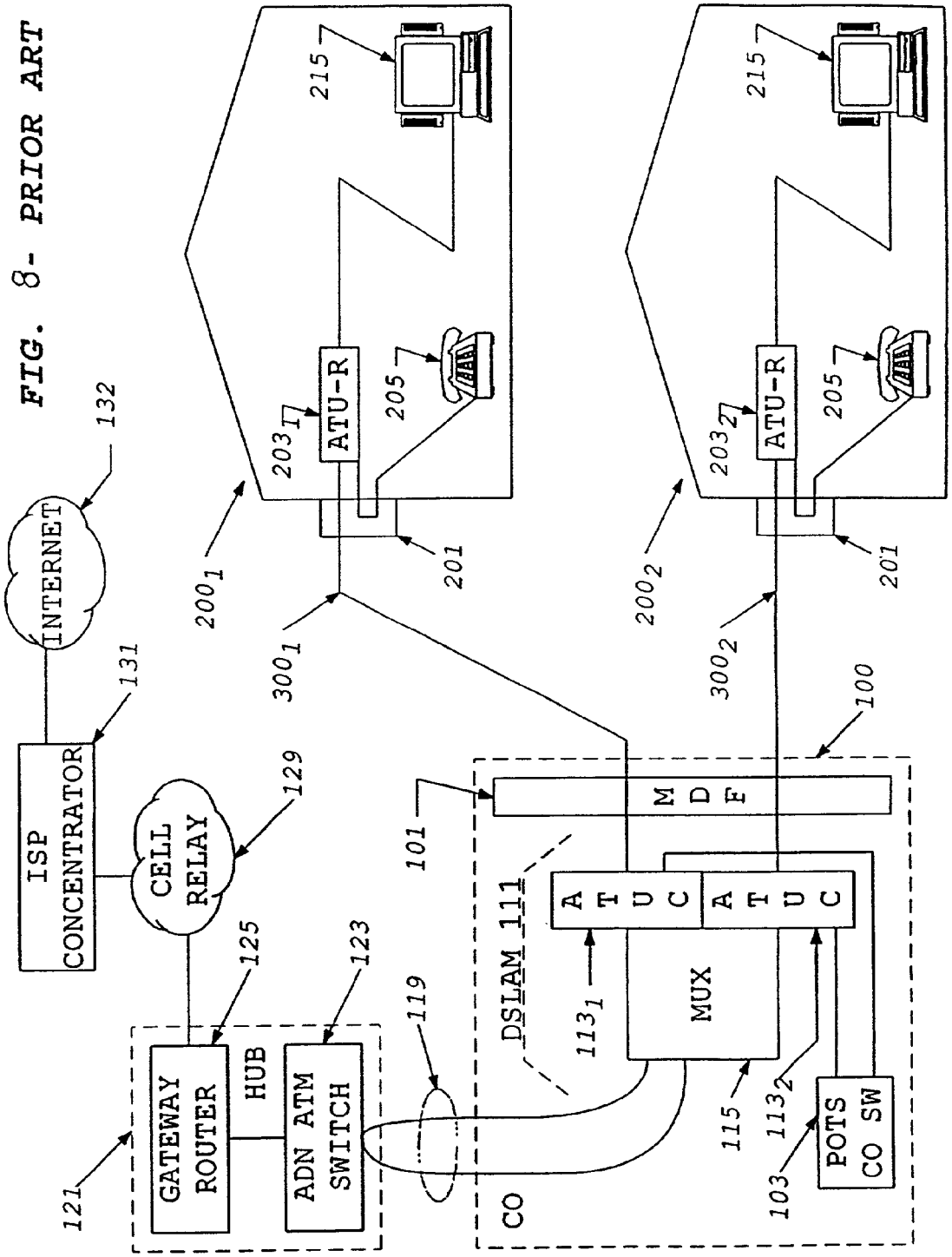
FIG. 8 - PRIOR ART

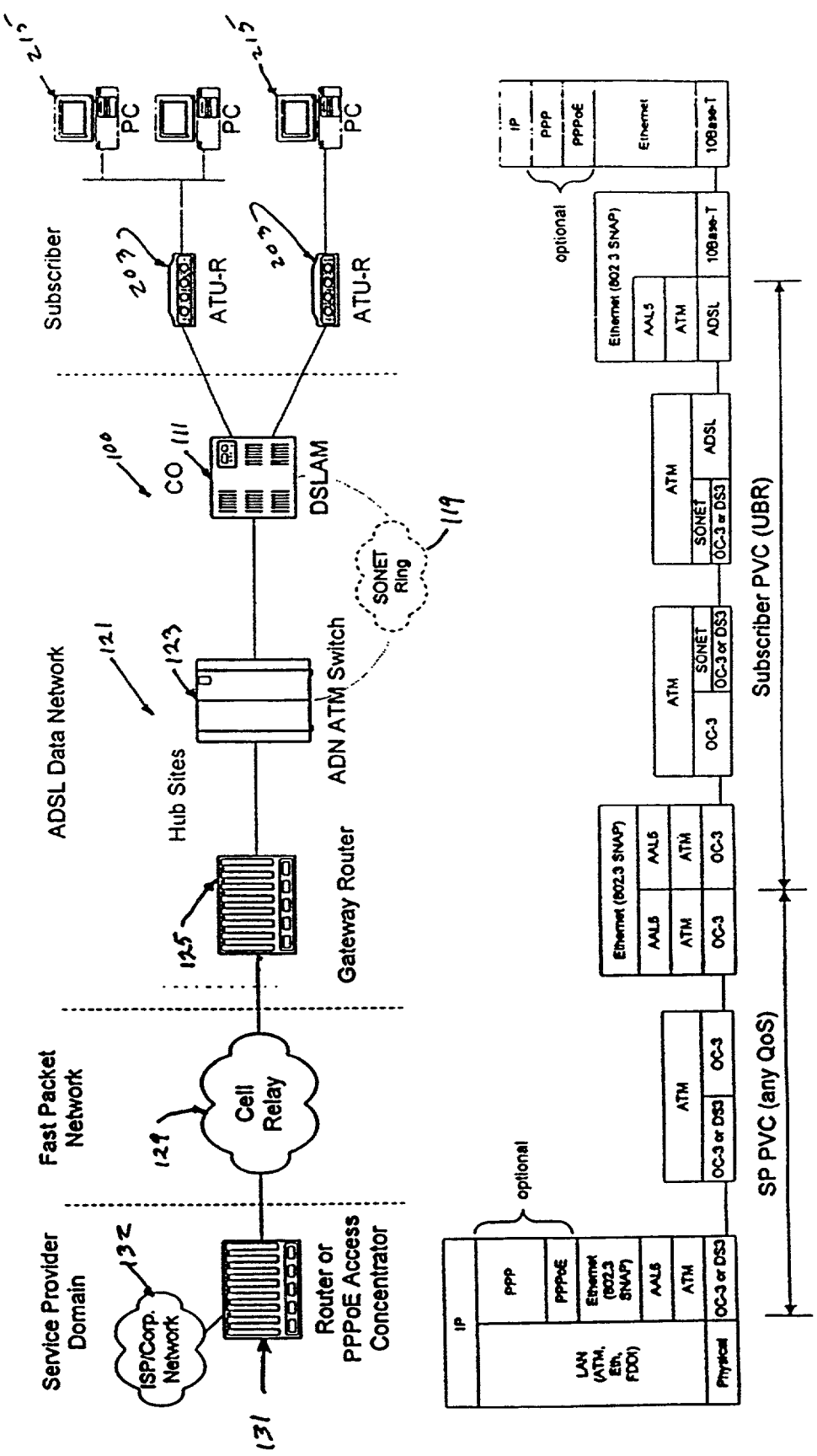
FIG. 9 - PRIOR ART

VERTICAL SERVICES INTEGRATION ENABLED CONTENT DISTRIBUTION MECHANISMS

CROSS-REFERENCE TO RELATED APPLICATION

This application is a continuation-in-part of application Ser. No. 09/635,695, entitled SUPPORT FOR QUALITY OF SERVICE AND VERTICAL SERVICES IN DIGITAL SUBSCRIBER LINE DOMAIN, filed Aug. 10, 2000.

FIELD OF THE INVENTION

Certain concepts involved in the present invention relate to techniques for implementing data communication services, for example in a local access network utilizing digital subscriber line technology, to support quality of service (QoS) and local introduction of vertical services. Other concepts involved in the present invention relate to distribution of content from a hub site to a server located at a central office through such a network.

BACKGROUND

Modern society continues to create exponentially increasing demands for digital information and the communication of such information between data devices. Local area networks use a network, cable or other media to link stations on the network for exchange of information in the form of packets of digital data. These networks have proven quite successful in providing data communications in commercial applications. However, the common local area network architectures require installation of specialized wiring and use of specific wiring topologies. For example, the most popular network protocols, such as Ethernet, require special rules for the wiring, for example with regard to quality of wire, range of transmission and termination. Furthermore, to extend communications to a wider domain still requires connection of at least one node of the local area network out to a wider area network, such as the network of an Internet Service Provider (ISP). High speed links enabling such wide area access from a LAN domain, for example using T1 lines, are quite expensive and justified only for hi-end commercial users.

A number of technologies are being developed and are in early stages of deployment, for providing substantially higher rates of data communication, for example ranging form 640 kb/s to 7.1 Mb/s. For example, cable television companies are now beginning to offer 'cable modem' services, which allow customers to communicate data over available bandwidth on the coaxial cable of a cable television network. After considering several other options, a number of the local telephone carriers are working on enhancements to their existing copper-wire loop networks, based on various xDSL technologies.

The term xDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

The current design goals of DSL data networks for Internet access do not support high-end vertical services, that is to say services demanding IP-based applications that require assurance of some level of quality of service (QoS). For example, packet-switched Voice over IP (VoIP) requires low latency, low jitter (i.e., a relatively constant bit rate), and non-correlated packet loss. Streaming video has similar requirements, and in addition, requires high bandwidth. DSL data networks designed to support high speed Internet and Intranet access have been optimized to support traffic that is bursty and is not sensitive to latency or jitter. For example, current implementations supporting ATM cell traffic employ the Unspecified Bit Rate (UBR) class of service, which does not provide any bandwidth or delay guarantees. Consequently, transport of video materials through such DSL data networks inflicts video delays, loss of audio/video synchronization, and image fragmentation.

Furthermore, lengthy bandwidth intensive sessions for video or other broadband applications may degrade the throughput to all other subscribers served through a shared node, such as a gateway router or a concentrated link. For two-way video, upstream will have even worse quality and throughput problems, due to the best effort nature of the DSL data network implemented for Internet access and because the upstream bandwidth is significantly less than that of the downstream channel.

To appreciate the situation and problems, it may be helpful here to consider an ADSL data implementation of a local access network, as a representative example, in somewhat more detail. FIG. 8 is a block diagram of a typical ADSL data network of the type currently in-use by a number of incumbent and competitive local exchange carriers to provide high-speed access to Internet Service Providers (ISPs) and thus to the Internet. FIG. 9 provides an alternative functional illustration of the elements of such a network. Of particular note, FIG. 9 shows the various protocol stacks in association with the appropriate network elements.

As shown in FIG. 8, a central office (CO) 100 provides plain old telephone service (POTS) and digital subscriber line data service for a number of customers. For purposes of discussion, assume that the equipment at each of the various customer premises 200 connects directly to the CO 100 via twisted pair type copper wiring 300. In an actual implementation, many customers may connect through such wiring to a remote terminal linked to the CO via optical fiber.

At each customer premises 200 in our example, the copper loop 300 carrying both the POTS and ADSL signals connects through a Network Interface Device (NID) 201 placed at the side of the home. A two pair loop is installed from the NID to the location where the ADSL unit 203, typically an ATU-R modem, is located in the home. One pair connects all of the signals on the line 300 from the NID 201 to the ADSL modem 203. Within the ATU-R type modem 203, a passive splitter/combiner type filter segregates the POTS signal and the data signals. The POTS signal is transmitted over the second twisted pair back to the NID 201. The POTS line is then connected to the in-home wiring extensions at the NID 201, for distribution to one or more standard telephone devices 205 in the home.

Within the ATU-R type ADSL modem 203, the downstream coded ADSL signal is demodulated and decoded to an appropriate data interface protocol for connection to the PC 215. The PC 215 or other data device (FIG. 9) also sends data to the ADSL modem 203. The modem 203 modulates the upstream data and transmits appropriate signals over the line $300_1$ or $300_2$ to the corresponding modem $113_1$ or $113_2$ in the CO 100 (FIG. 8). The ATU-R interface may support bridging, such that multiple users can share the ADSL modem 203, for two-way data communication through the CO 100.

The lines 300 for the customer premises 200 connect through the main distribution frame (MDF) 101 to a Digital Subscriber Line Access Multiplexer (DSLAM) 111. The DSLAM includes a bank of ADSL terminal units of the type intended for central office applications, identified as ATU-Cs 113. The DSLAM also includes a multiplexer/demultiplexer (MUX) 115.

Within the DSLAM 111, each customer line 300 connects to an assigned ADSL terminal unit 113 in the central office (ATU-C). In the example illustrated, the first customer's line $300_1$ connects through the MDF 101 to a first ATU-C $113_1$ in the CO 100. The second customer's line $300_2$ connects through the MDF 101 to a second ATU-C $113_2$ in the CO 100. The ATU-C type ADSL units 113 include appropriate frequency dependent combiner/splitters, for segregating out the voice telephone traffic. Thus each ADSL unit 113 provides a connection for telephone traffic from the associated line 300 to the POTS switch 103.

The ADSL units 113 in the CO (ATU-Cs) essentially act as modulator/demodulators (modems) for sending and receiving data over the subscriber telephone lines 300. On the network side, each of the ATU-Cs 113 connects to the MUX 115. The MUX 115 multiplexes and demultiplexes the upstream and downstream data for the ADSL modems 113 and provides a connection to a high-speed link 119. Through subtending, the MUX 115 may also provide a data concentration for the communications over the link 119.

In a typical implementation, the concentrated data communications utilize a DS-3 link 119. However, because of increasing traffic demands, it is becoming necessary to upgrade the link 119 to SONET optical fiber, such as OC-3 or in some cases even OC-12. The link 119 provides two-way data communication between the central office 100 and a data hub 121. In practice, this is a relatively long or wide area link using expensive interoffice facilities.

On the upstream side, the high-speed interoffice link 119 terminates on an ATM switch 123 for the ADSL data network (ADN). Although only one link 119 appears in the drawing, the asynchronous transfer mode (ATM) switch 123 will typically service a number of DSLAMs 111 in various end offices via similar DS or OC links. The ATM switch 123, in turn, provides a high-speed connection to a gateway router 125 coupled to an ATM cell relay network 129. Typically, the ATM switch 123 will aggregate traffic from a number of such links 119 onto an OC-3 or higher rate SONET link to the router 125. The router 125 and the cell relay network 129 enable transport of ATM cells for the subscribers to and from equipment of one or more Internet Service Providers (ISPs), shown by way of example as a concentrator 131 coupled to the public packet switched network commonly known as the Internet 132.

The illustrated local access type ADN network provides ATM cell transport from a customer premises 200 to the ISP concentrator 131. The ATM cells serve as the layer-2 routing or switching protocol for the lowest level definition of connectivity between two points of the network. Higher level protocols ride within the ATM cells.

The ATU-Rs 203 and the customer premises data equipment 215 connect via an Ethernet coupler. The customers' equipment communicates across the ADSL data network utilizing Ethernet, and the wide area communication involves transport of Internet protocol information typically in TCP/IP frames within Ethernet frames. The Ethernet frames carrying the TCP/IP frames are adapted into ATM cells. Attention is directed to the protocol stacks illustrated in the lower half of FIG. 9.

To efficiently provide cell relay, each customer is assigned an ATM virtual circuit that extends from the ATU-R 203 in the respective customer premises 200 to the gateway router 125. Although it was originally envisioned that ATM would support switched logical channels or virtual circuits, to date, such logical switching has proven impractical to implement and administer. Consequently, current practical ATM networks actually utilize permanent virtual circuits, not switched virtual circuits. For a given subscriber, the carrier therefore provisions an ATM permanent virtual circuit from the ATU-R 203 to the gateway router 125. The carrier programs one or more nodes along the path of that logical circuit, particularly the DSLAM 111, to regulate traffic on the virtual circuit to the upstream and downstream rates corresponding to the grade of service to which the particular customer subscribers. All data traffic for the subscriber goes over the entire length of the permanent virtual circuit, and most if not all nodes along that path limit that traffic to the rates of the subscription as defined in the provisioning data.

The virtual circuit may be thought of as a solid pipe. All traffic passes through the entire length of the pipe-like virtual circuit, regardless of how many switches or other nodes the circuit passes through. The layer-2 protocol defining the circuit carries all of the higher level traffic end-to-end. Higher layer protocols are visible only at the ends of the pipe. Hence, any traffic flow processing intended to utilize the higher layers must occur at some point past one end or the other end of the virtual circuit.

The gateway router 125 also terminates permanent virtual circuits through the cell relay network 129 going to/from the ISP concentrators 131. The gateway router 125 aggregates traffic between a number of subscribers and each respective ISP. The ISP equipment 131 typically implements a variation of a point-to-point protocol (PPP) specifically adapted to ride over Ethernet, referred to as "PPP over Ethernet" (PPPoE). The virtual circuits to the ISPs, however, do not have sufficient capacity to simultaneously carry all subscriber traffic at the maximum rates of the customers' subscriptions. The MUX 115, the ATM switch 123, and the gateway router 125 concentrate and regulate the subscriber traffic going to and from the ISPs, typically on some type of "best efforts" basis.

In a typical Internet access service offering, the most expensive service tier provides 7.1 Mbps for downstream communication and 680 kbps for upstream communication. The next grade of service provides 1.6 Mbps for downstream communication and 90 kbps for upstream communication, whereas the lowest tier of service provides 640 kbps for downstream communication and 90 kbps for upstream communication. The maximum grade of service offered to an individual subscriber depends on the rates for which the subscriber's line can qualify, although the subscriber may opt for a lower rate service since the higher-rate service is more expensive.

The approach outlined above relative to FIGS. 8 and 9 works well for Internet access if the traffic relates to web access, file transfers and the like, which do not require guaranteed quality of service. Various segments of the Internet industry, however, are rapidly developing new multimedia services and applications that already are pushing the capabilities of such a network. For example, increasingly, Internet traffic includes a number of types of communication that require a guaranteed quality of service. Voice telephone communication over IP is extremely sensitive to latency and jitter. The permanent virtual circuits provide an unspecified bit rate (UBR) service and do not guarantee any minimal amount of delay or jitter. Also, because the rates are set by subscription, the service tends to be relatively inflexible. Some services, such as multicasting of broadband information from the Internet into the local access ADN for a large number of concurrent users, can quickly overload one or more nodes or critical links of the network, for example the link 119 between the DSLAM 111 and the ATM switch 123 at the hub 121.

Most industry experts propose to increase the services available via the public Internet. However, because the higher layer protocols are visible only on the Internet side of the virtual circuit "pipe," these services all must be implemented out past the end of the virtual circuit, at least behind the gateway router 129 and most likely in the public network, where it is possible to view and route based on higher level protocols, particularly Internet protocol (IP). Such a migration strategy to implement new services creates severe problems. For example, in the network of FIG. 8, if a customer at premises $200_1$ desired to order a video on demand, the customer would communicate via the assigned permanent virtual circuit and the ISP to a server on the Internet 132. The server would send the video stream back through the Internet 132, the ISP equipment 131, the cell relay network 129 and the virtual circuit from the router 125 to the ATU-R 203 for handoff to a PC or the like at 215. If the rate of the requested video exceeds the customer's subscription rate, the customer could not view the video in real time during the download. Even if the rate of the requested video is below the customer's subscription rate, loading in the Internet or the local access network may impose delays and/or jitter in communication of some segments of the requested video. Assuming that the hub 121 and the links 119 implement a subscriber concentration, ordering of videos or similar broadband files from the Internet 132 quickly consumes the shared resources through the hub 121 and the links 119, reducing the rates of service provided to other customers seeking concurrent Internet access.

It might be possible to increase the capacity of the links 119 and/or the hubs 121; however, this tends to increase the carrier's recurring costs and often makes the overall service(s) of the ADN network economically impractical.

It has also been suggested to provide customers guaranteed quality of services for some portion of their communications, by segregating the traffic carried between the customer premises and the hub 121. This would require assigning a plurality of ATM permanent virtual circuits to each subscriber, one for each different guaranteed level of quality of service and one for all other Internet traffic for the subscriber. Administration and provisioning of one virtual circuit per subscriber is already complicated, and the number of virtual circuits through any given ATM node is limited by current equipment designs. Expanding the number of permanent virtual circuits per subscriber to support multiple QoS tiers of service therefore would be quite expensive, and the management thereof would become a nightmare. To support an increased number of virtual circuits, many having guaranteed QoS requiring some substantial minimum rate at all times, would also require that the operator substantially upgrade the network to increase the end-to-end capacity all the way to the wide area network 132.

Furthermore, to actually receive the desired QoS requires that all elements involved in the communication must guarantee the desired level or quality of service. For communications across the public Internet 132, this means that various nodes and links on the public Internet must be available and capable of providing a guarantee of the desired QoS. In point of fact, few nodes on the public Internet actually support any type of QoS. Hence, even if the ADN supported a desired QoS, most subscribers would not benefit from that service because their communications over the public Internet would have no QoS guarantee, and would suffer from the usual problems of latency and jitter.

Consequently, current deployments of ADSL-based data networks, such as shown in FIGS. 8 and 9 generate many customer complaints. From the customer perspective, the service does not deliver the data rates that the customer pays for on a consistent basis. The customer typically blames such problems on network equipment failure. In fact, most of the problems already are due to virtual circuit congestion problems, of the kinds outlined above. Essentially, the ADN network is crippled by the unpredictable nature of the service levels that the customers perceive due to congestion on the ADN and on the public Internet.

Also, with this approach, because all of the major service elements are implemented in servers accessible to the Internet, all of the services are subject to severe security risks. Each service provider's server is accessible to virtually any computer coupled for communication via the Internet. This openness is a desirable feature of the public Internet. However, a consequence is that any such server is accessible to and thus subject to attack from any hacker having Internet communications capabilities. Popular services, particularly those generating substantial revenues, become prime targets for attack.

Another area of problems is that the ADN does not offer the carrier any technique for offering its own differentiated service applications. To compete with other service providers, the carrier operating the ADSL-based data network needs to introduce its own multimedia services, for example, its own video services to compete with video services of cable television companies (that offer competing Internet access services). As noted above, however, introduction of a new service, such as true video on demand or broadcast video requires communications via the public Internet 132. This is true even if the carrier operating the network of FIGS. 8 and 9 wanted to initiate its own video service(s).

Hence, there is an ongoing need to improve the architecture and operation of a digital subscriber line data communication network, particularly to facilitate finer gradation of services within the local network. The need, first, is for such a local network to support introduction of services on a 'vertical' basis within the local access network separate and apart from the common forms of Internet traffic, both for commercial differentiation and for increased security.

As one type of vertical service, there is a further need for services implemented within the local access network for distribution of content to the customers, e.g. local video or music or multimedia, on-demand. Such vertical service insertion of locally stored content creates certain related needs. For example, this insertion would give rise to a further need, which is to transfer content from a central content server, within some hub site, to local content servers within the respective central offices. Further, this distribution of content must utilize some mechanism so that it will not compromise the quality of service for broader network traffic between the hub site and the respective central offices.

In a related need, the local network needs to support a number of different levels of quality of service (QoS). There also exists a need for upstream traffic to be shaped by customer equipment located at or near the interface between a customer's network and the ADN according to traffic destinations.

SUMMARY OF THE INVENTION

A general objective of the invention is to implement an enhanced digital communication network for subscriber lines that supports vertical introduction of new communication and/or multimedia services.

A further objective is to support multiple levels or grades of quality of service within the access network.

Another objective of the invention relates to improvement of the cost effectiveness of the data network, for example, by reducing the demand for high-capacity interoffice links while increasing the bandwidth available at the network edge for at least some types of services.

A related objective is to provide a technique for introduction of new high-end services near the network edge, such as content distribution, from a domain that is more secure and therefore less subject to hacker attacks.

A further objective of the invention is to distribute content between a central content server within a hub site and local content servers in the vertical services domains of the respective central offices. The distribution of content is accomplished utilizing bandwidth between the hub site and the respective vertical services domains that are unused by subscriber traffic.

The invention relates to methods and network architectures facilitating distribution of content between servers, in an access data network. Over a common network link, the distribution uses otherwise available capacity. Broader classes of traffic have a higher priority for accessing the bandwidth and are not impacted by the transport of content data over the common link. The distributed content then is available for delivery, for example on an "on-demand" basis to end-use customers.

The preferred embodiments of the ADN architecture alleviate many of the other noted problems by providing an intermediate node, typically an enhanced switch, to segregate upstream traffic based on analysis of the type of communication. This analysis utilizes protocol information contained in each communication, for a protocol higher than the switching protocol, that is to say higher than a protocol used to define the customer's logical circuit. One type of traffic remains on the virtual circuit, whereas other traffic is handed off to a vertical services domain. The node also provides a point to aggregate traffic from the vertical services domain with other traffic on the subscriber's logical circuit, for transport to the customer premises equipment.

The switch at the intermediate node essentially subdivides the upstream traffic and aggregates downstream traffic, associated with each subscriber line. One branch goes to a gateway router and hence to one or more ISP(s) at the rate corresponding to the Internet access subscription. It may be helpful to consider this as long distance or wide area traffic for the subscriber. The other branch is for local traffic, to and from the locally connected vertical services domain. The remote content delivery servers are coupled to various vertical services domains, typically in different end offices. The interconnection to the vertical services domain supports QoS and introduction of vertical services not easily provided from the public Internet, such as video on demand, multicasting, and voice over IP. The vertical services domain is relatively secure since it is not accessible from the public Internet.

The vertical services domain also represents a communication network. The vertical services domain, however, preferably takes the form of a data network optimized for local transport of vertically injected services, that is to say local data traffic. In view of its local nature, it is easier and more cost effective to provide high bandwidth services, such as content distribution to customers, from the local domain. The vertical services network, for example, could take the form of a giga-bit Ethernet type local area network. Also, it is easier to adapt the vertical services network to support service level agreements with customers with regard to quality of service. In many cases, it actually is sufficient to support QoS on the one hop through the ATM switch, itself.

An aspect of the invention relates to the distribution of content from a central content server within a hub site to local content servers within the respective vertical services domains of remote central offices. Content is routinely and periodically distributed between a plurality of local vertical services domains and the hub site server. The hub site may include a gateway router, which is an ATM switch, and the central content server in communication with the gateway router. Alternatively, the hub site may include an enhanced hub switch and one or more further local services domains. In such an implementation the central content server communicates via the local services domain and the hub switch.

Each of the remote central offices may house another switch, with vertical services insertion capabilities, and local content servers in communication with the vertical services insertion switch. The content is distributed, such that the distribution of content does not interfere with subscriber traffic between the hub site and the respective switches at the respective central offices. This is accomplished by utilization of otherwise unused bandwidth between the hub site and remote central offices during time periods when subscriber traffic does not utilize the entirety of this bandwidth. Once the content is distributed and stored on the local content servers at the remote central offices, the end users served by each central office can access content at a high speed from the nearest vertical services domain, without compromising the bandwidth allocated for Internet traffic or other traffic between the hub site and the respective remote central office.

A further aspect of the invention relates to unique software for implementing the distribution of content. A software product, in accord with this aspect, includes at least one machine readable medium and programming code, carried by that medium. Although the inventive concepts encompass operation from a single, common server, in a preferred embodiment, the code includes several cooperating applications which may reside in separate media and run on two or more servers or other network nodes.

A computer readable medium, as used herein, may be any physical element or carrier wave, which can bear instructions or code for performing a sequence of steps in a machine readable form. Examples of physical forms of such media include floppy disks, flexible disks, hard disks, magnetic tape, any other magnetic medium, a CD-ROM, any other optical medium, a RAM, a ROM, a PROM, an EPROM, a FLASH-EPROM, any other memory chip or cartridge, as well as media bearing the software in a scannable format. A carrier wave type of medium is any type of signal that may carry digital information representative of the instructions or code for performing the sequence of steps. Such a carrier wave may be received via a wireline or fiber-optic network, via a modem, or as a radio-frequency or infrared signal, or any other type of signal which a computer or the like may receive and decode.

To support the QoS requirements, a feature of the preferred embodiments involves certain queuing and tagging operations within the switch at the intermediate node. Essentially, the switch will maintain two or more queues for each permanent virtual circuit. The switch distinguishes the queues based on importance. As the switch receives cell transmissions for transport over the virtual circuit, for example to the customer premises or between servers, the switch will internally tag each cell as to its importance level and place the cell in the appropriate queue. The switch may implement any one of a number of different algorithms to select and transmit cells from the various queues. For subscriber services, for example, the particular algorithm is selected to implement QoS in conformance with the subscriber's service level agreement with the carrier and/or agreements between the carrier and the vertical services providers.

In preferred embodiments, the same QoS mechanisms are applied to the logical circuit(s) carrying content between the servers. Using these mechanisms, it is possible to provision such a circuit with a combination of a small guaranteed rate and an "as-available" capacity, such as unspecified or available bit rate service. Alternative embodiments use one or more ATM PVC circuits, for each logical link between the servers. If one PVC is used, for example, the ATM circuit may be provisional with UBR+ service, to have a minimal reserved bandwidth in combination with an unspecified bit rate (UBR) service.

Within the one virtual circuit assigned to the individual subscriber, the invention actually provides multiple tiers of service, preferably with multiple levels of QoS. Also, at different sections along the virtual circuit "pipe," the network provides different levels of rate shaping. All layers and all services are available at the home, but different services receive different treatments in the network conforming to the different levels of QoS. The inventive approach, however, does not require each subscriber to have multiple virtual circuits.

Services provided on the vertical services domain appear as IP data services. Virtually any communication service may utilize the vertical services network and through it to gain access to the carrier's local customer base, simply by providing an IP interface for coupling to the vertical services network. For example, it is a simple matter to connect any digital source of broadcast audio or video information, such as a direct satellite broadcast receiver system similar to those used today in residential applications, through an IP interface. Such a broadcast source and interface can provide the full range of received video services, over the vertical services network. The access data network may distribute the video programming to a number of access switches within a local geographic area. The switch provides an optimum point for frame or cell replication for multicasting services. Hence, in our video example, the switch replicates and distributes frames for the broadcast service over the digital subscriber line circuits to customers desiring to view the programming.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIG. 8 is a block diagram of a prior art asymmetrical digital subscriber line data network.

FIG. 9 is a slightly modified functional block diagram of the prior art network illustrating the protocol stacks used in the various network elements.

DETAILED DESCRIPTION OF THE PRESENTLY PREFERRED EMBODIMENTS

Figure 1:
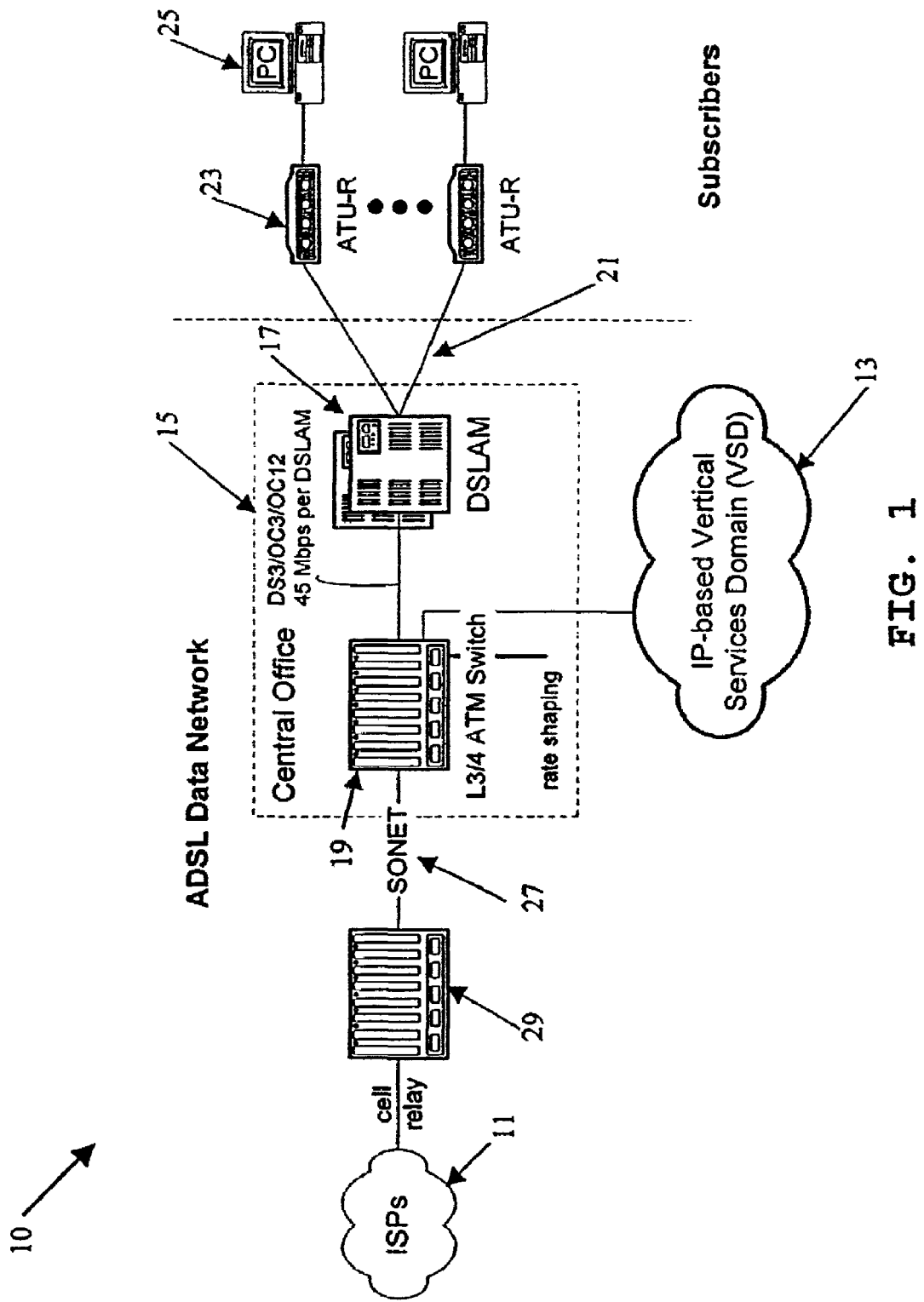
FIG. 1 is a functional block diagram of a digital subscriber line data network supporting enhanced services in accord with the inventive concepts.

The inventive network architecture introduces QoS into the ADN, in a manner that enables the delivery of sophisticated and demanding IP-based services to subscribers. The architecture does not affect existing Internet tiers of service such that the promised rates for such access appear the same as offered today. Also, the new architecture is cost-effective in terms of initial costs, build-out, and ongoing operations. The architecture utilizes an access switch or router capable of examining and selectively forwarding packets based on a relatively higher layers of the protocol stack, that is to say based on information encapsulated within the layer-2 information utilized as the lowest level definition of connectivity through the network. The access switch enables segregation of upstream traffic by communication type and downstream aggregation of wide area traffic together with traffic from a local vertical services domain.

In the downstream direction, the switch aggregates traffic for each subscriber. The switch receives the rate-limited traffic from the packet switched network, on the subscriber's logical circuit. The switch also receives any downstream traffic intended for the subscriber, from the vertical services network. The switch combines this traffic and sends the combined communications downstream over the subscriber's logical circuit to the customer premises, at the optimum downstream rate that the subscriber's facilities can support.

The upstream segregation and the downstream aggregation allow insertion of new localized services on a "vertical" basis, at the intermediate node. The invention encompasses vertical insertion of a wide range of services from the new vertical domain. One class of services, of particular interest here, relates to content distribution from servers in the vertical domain, e.g. on-demand. To support such services, the network should also allow efficient distribution of content between a central or "hub" site and the servers in the local vertical services domains.

In accord with the invention, content data stored on a central content server at a hub site is systematically and periodically replicated and updated to and from local content servers in the vertical services domains at the respective central offices. Accordingly, a customer serviced by a central office has access to the content stored on the local content servers at a relatively high data rate that does not substantially compromise the rate to which the customers access a broader network, such as the Internet. Data replicated from the central content server to the respective local content servers can be conveniently communicated over the link between the hub site and central offices, which also carries the customers' broader network traffic. The present invention mitigates the problem of network congestion during replication of data between the central content server and the respective local content servers, by only transferring such content data using bandwidth that is not used by the broader class(es) of network traffic. This aspect of the invention requires continuous analysis of the bandwidth utilizational of the link between the hub site and the respective central offices.

Figure 2:
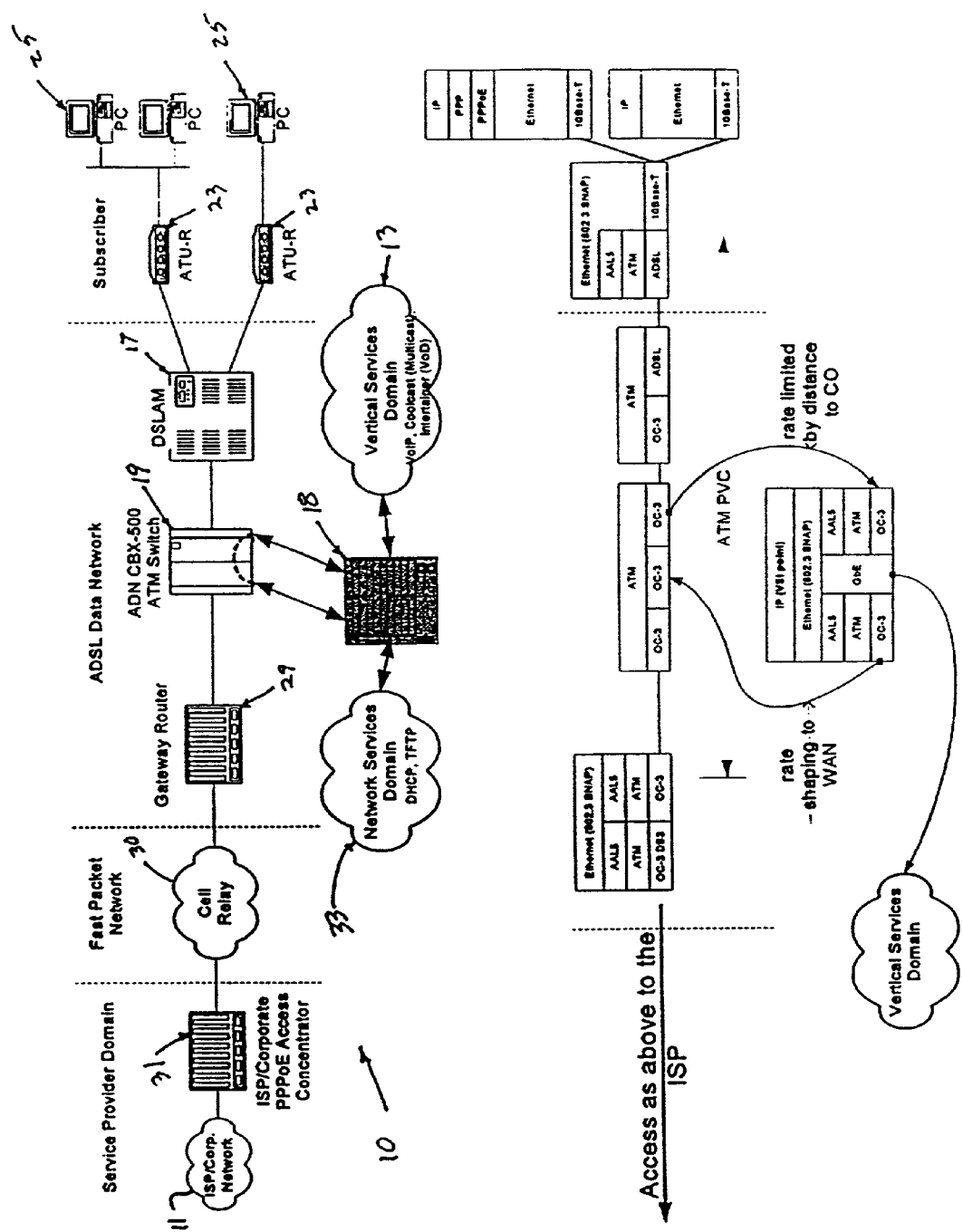
FIG. 2 is a slightly modified functional block diagram of network of FIG. 1, illustrating the protocol stacks used in the various network elements.

FIG. 1 provides a high-level functional illustration of an exemplary digital subscriber line network, specifically an ADSL data network 10, implementing the various concepts of the present invention. FIG. 2 provides an alternative functional illustration of the elements of such a network. Of particular note, FIG. 2 shows the various protocol stacks associated with the appropriate network elements that utilize those stacks. The end-user may be a single PC user or a small business or a residential LAN user. The data equipment of such users typically includes servers and PCs and may include a variety of other devices, such as fax machines, televisions, recorders and remote controlled appliances, having data communication capabilities.

The customer access link comprises an xDSL twisted pair, although those skilled in the art will recognize that the invention is readily adaptable to networks using other types of links to the subscriber premises. In the illustrated embodiment, the network 10 supports ADSL, which the carrier may offer in grades supporting 640 kbps, 1.6 Mbps or 7.1 Mbps (downstream) rates for Internet access. The actual communications over the DSL loops, however, run adaptively at the maximum rates that the line conditions allow.

The illustrated first embodiment of the ADSL-based local access data network or "ADN" 10 provides access to two different network domains for communication services. The two network domains are logically separate. In most implementations, the first domain may be considered as a long distance or wide area domain, whereas the second domain is a local network domain. In the illustrated example, the ADN 10 provides access to a first domain in the form of a wide area internetwork, such as the public Internet, corporate local area networks (LANs), and the like, represented by the network cloud 11 for the ISPs. The high speeds available through the local network 10 enable a wide range of communications, for example, of text data, of video data, for multimedia, for web browsing, of transfers of files, for database searching, and the like via the network(s) 11.

The inventive ADSL-based local access network 10 also offers access to a wide variety of other IP-based services through a local data network 13 serving as the vertical services domain (VSD). The vertical services typically are high-end services requiring certain QoS levels and often having a certain local characteristic. Many of these services entail distribution of content, from local storage servers in the vertical services doamin to actual customers. Examples of the vertical services, including content distribution services, are discussed in more detail later. The vertical services network offers an efficient domain from which the carrier can locally inject high-end services and/or services of other local providers. Because the vertical services domain is separate from the public Internet, equipment providing the vertical services is not subject to attacks directly from the public Internet.

The invention in this case particularly involves content distribution between a hub site and the servers in various vertical services domains. However, to appreciate the operation and advantages of that aspect of the invention, it may be helpful first to consider the overall network operation and the details of the vertical services insertion.

As shown in FIGS. 1 and 2, a central office (CO) 15 comprises one or more DSLAMs 17 and L3/4 ATM switch 19. Elements of the CO 15 providing plain old telephone service (POTS) have been omitted for simplicity of illustration, since they are generally similar to those shown in FIGS. 8 and 9.

The switch 19 is designated as an "L3/4" switch here as a matter of convenience, to illustrate that the switch 19 has the capability to make selective packet forwarding decisions based on protocol information at some level that is above the L2 level that the switch normally utilizes to define or establish logical circuit connectivity. It will be recognized, however, that some of the protocols, although higher than the ATM type level 2 protocol used by the preferred switch are themselves often thought of as level 2 protocols even though they are above or encapsulated in the ATM type level 2 information. Also, decisions as to the selective forwarding may be made in response to monitoring of any level of the protocol stack above the L2 level that the switch normally utilizes to define or establish logical circuit connectivity, for example from any level above ATM all the way up to the L7 application layer.

Returning to the discussion of FIGS. 1 and 2, for purposes of this discussion, assume that the equipment at the various customer premises connect directly to the CO 15 via twisted pair type copper wiring 21. In an actual implementation, many customers may connect through such wiring to a remote terminal linked to the CO 15 via optical fiber. Other hardwired, optical or wireless implementations of the digital subscriber lines are discussed later. In the illustrated embodiment, each line 21 from a customer premises connects to an ATU-C within one of the DSLAMs 17.

On the customer premises side, the digital subscriber line circuit 21 connects to an ADSL terminal unit (remote) or ATU-R 23. The ATU-R 23 is a modulator/demodulator (modem) for communicating over a twisted wire pair type line 21, in accord with the ADSL protocols. The ATU-R in turn connects to customer premises equipment, shown by way of example as a PC 25 at each location (FIGS. 1 and 2). Those skilled in the art will recognize that the customer premises equipment 25 may include a wide range of other types of devices having data communications capabilities (see e.g., FIG. 3).

The ADSL user's normal telephone equipment (not shown) also connects to the line 21, either directly or through a frequency combiner/splitter, which often is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Such modems may implement either one of two techniques for dividing the usable bandwidth of the telephone line to provide these channels. One approach is to divide the usable bandwidth of a twisted wire pair telephone line by frequency, that is to say by Frequency Division Multiplexing (FDM). The other approach uses Echo Cancellation. FDM uses one frequency band for upstream data and another frequency band for downstream data. The downstream path is then divided by time division multiplexing signals into one or more high-speed channels and one or more low speed channels. The upstream path also may be time-division multiplexed into corresponding low speed channels. With echo Cancellation, the upstream band and downstream band substantially over-lap. The modems separate the upstream and downstream signals by means of local echo cancellors, in a manner similar to that used in V.32 and V.34 modems.

The DSL modems may use a number of different modulation techniques to physically transport digital data streams. A number of implementations of the modems have used carrierless amplitude phase (CAP) modulation. Most current xDSL modems, however, utilize a discrete multi-tone (DMT) approach.

Returning to the discussion of the CO 11, the structure and operation of each DSLAM 17 is essentially the same as those of the DSLAM 111 in the embodiment of FIG. 8, except that the control functionality of the DSLAM 17 is somewhat different. The DSLAM 17 controls the ATU-Cs to implement a rate-adaptive ADSL service, to adapt operations so as to maximize data rates for the communications over the individual subscriber lines. Essentially, the ATU-Cs and ATU-Rs signal each other over the lines to synchronize their modes of operation at parameter settings, which achieve optimum data throughput. Also, the DSLAM 17 does not need to monitor or limit the line rates, but instead relies on the rate-adaptive control algorithm to maximize the rates achieved over the ADSL circuits or provide rate-shaping for the ATM virtual circuits. Other network elements limit rates, where necessary.

The L3/4 ATM switch 19 is co-located with the DSLAMs 17, within one central office 15. As a result, it is practical to connect the multiplexer within each of the DSLAMs 17 over a high-speed data link directly to an appropriate port of the ATM switch 19. Because these links are short, there is little or no cost imposed when implementing such links using wideband equipment. By itself, the co-location of the L3/4 ATM switch 19 with the DSLAM(s) 17 does not increase bandwidth. Rather, it makes increased bandwidth at the network edge economically feasible, due to proximity. Co-location removes the requirement to purchase expensive wide area transport (the SONET ring) to increase bandwidth.

In particular, the direct OC3/OC12 connections between the DSLAM 17 and the L3/4 ATM switch 19 do not incur any recurring tariff expenses.

The ATM switch 19 connects through a SONET ring 27 to a gateway router 29 providing ATM transport through a cell relay network 30 (FIG. 2) to the ISPs shown at network 11 in the drawings. Most of the ISPs will utilize a concentrator or other equipment as their point of presence for Internet access (FIG. 2). In the preferred embodiment, the equipment 31 provides a point-to-point protocol (PPP) interface designed for transport over Ethernet (PPPoE). The ATM switch 19 also provides a connection to the local implementation of the VSD network 13, for example via a giga-bit Ethernet port to a switch or other local network elements 18.

The illustrated local access type ADN network 10 provides ATM cell transport from the customer premises to the ISP network(s) 11. The ATM cells serve as the layer-2 protocol for defining contiguous switched connectivity. Higher level routing protocols, such as Ethernet and TCP/IP frames, ride within the ATM cells. Services of different types utilize different protocols at one or more layers above the ATM cell layer. In the preferred embodiments, all communications utilize Ethernet. However, communications to and from the ISPs use the noted PPPoE type Ethernet protocol. In contrast, communications to and from the vertical services domain use one or more of the other Ethertype protocols.

To efficiently provide cell relay, each customer is assigned a virtual circuit that extends from the ATU-R 23 in the respective customer premises to the gateway router 29. This logical circuit is defined at the layer-2 protocol level. The presently preferred embodiments implement this logical communication circuit as an ATM permanent virtual circuit, although the inventive concepts may apply to other types of logical circuits or channels.

The gateway router 29 is the communication node of the access network 10 providing access to the wide area IP packet networks, of corporations or more often of Internet Service providers. The gateway router 29 terminates permanent virtual circuits through the cell relay network 30, from the equipment 31 of each such wide area packet network provider 11. The gateway router 29 also terminates the permanent virtual circuits from the subscribers through the data network 10. For communication with a selected ISP network 11, for example, the gateway router 29 routes cells from the permanent virtual circuit from the subscriber through to the permanent virtual circuit of the selected ISP network 11. In the opposite direction, the gateway router 29 routes cells from the permanent virtual circuit from the selected ISP network 11 through to the permanent virtual circuit of the particular subscriber.

For the leg of the subscriber's logical circuit, extending from the L3/4 ATM switch 19 through the gateway router 29, the carrier programs one or more nodes along the path behind the DSLAMs 17, to regulate traffic on the virtual circuit to the rate corresponding to the grade of Internet access service to which the particular customer subscribes. In the preferred embodiment, at least one such node performing this rate shaping function is the L3/4 ATM switch 19. All traffic going to and from the ISP network(s) 11 therefore is still limited to the rates defined in the service level agreement (SLA) for Internet access that the carrier has with the particular customer.

The portion of the virtual circuit extending between the ATM switch 19 and the ATU-R 23, however, is not rate limited but instead runs at the maximum rate that the line will support using the rate-adaptive ADSL modem operation. In most cases, the rate-adaptive ADSL modem operation will support rates substantially higher than the subscription rate for Internet access service.

The L3/4 ATM switch 19 also provides the interconnection to the subscriber's virtual circuit for insertion of downstream traffic from the vertical services domain 13 and separation of upstream traffic from the subscriber's virtual circuit going to the vertical services domain 13. In the preferred embodiments, decisions as to whether upstream traffic is destined for the vertical services domain 13 or should remain on the subscriber's virtual circuit going through the gateway router 29 and the cell relay network 30 to the ISPs 11 are based on an analysis of traffic type. The traffic type analysis relies on protocol information contained in the communications, which relates to layers of the protocol stack that are higher than the layer-2 switching protocol, in this case above the ATM layer.

As shown in FIG. 2, traffic destined for an ISP 11 utilizes a variation of a point to point protocol (PPP) intended to run on top of Ethernet, referred to as PPP over Ethernet or "PPPoE." A 'type' indicator contained within the Ethernet frames identifies the PPPoE protocol. In contrast, traffic going to and from the vertical services domain utilizes other 'types' of Ethernet protocol. All traffic to and from the customer premises uses Ethernet frames carried within ATM cells.

The switch 19 therefore routes a subscriber's traffic going to and from an ISP 11, upon detection of the PPPoE indicator in the level 3 data contained within the Ethernet cells. This traffic will also utilize public IP addressing. In contrast, the ATM switch 19 routes a subscriber's traffic going to and from the vertical services domain, upon detection of any other type of Ethernet protocol at level 3 or above in the protocol stack. The IP addressing in the vertical services domain 13 utilizes private-IP addresses, for example, as administered with a DHCP server (not shown) coupled to the network cloud 33. Although shown separately, the cloud 33 may be implemented as a portion of the network providing the physical elements of the vertical services domain. The portion 33, however, would typically be a logically separate domain that the carrier controls and restricts for its own network administration use.

Figure 3:
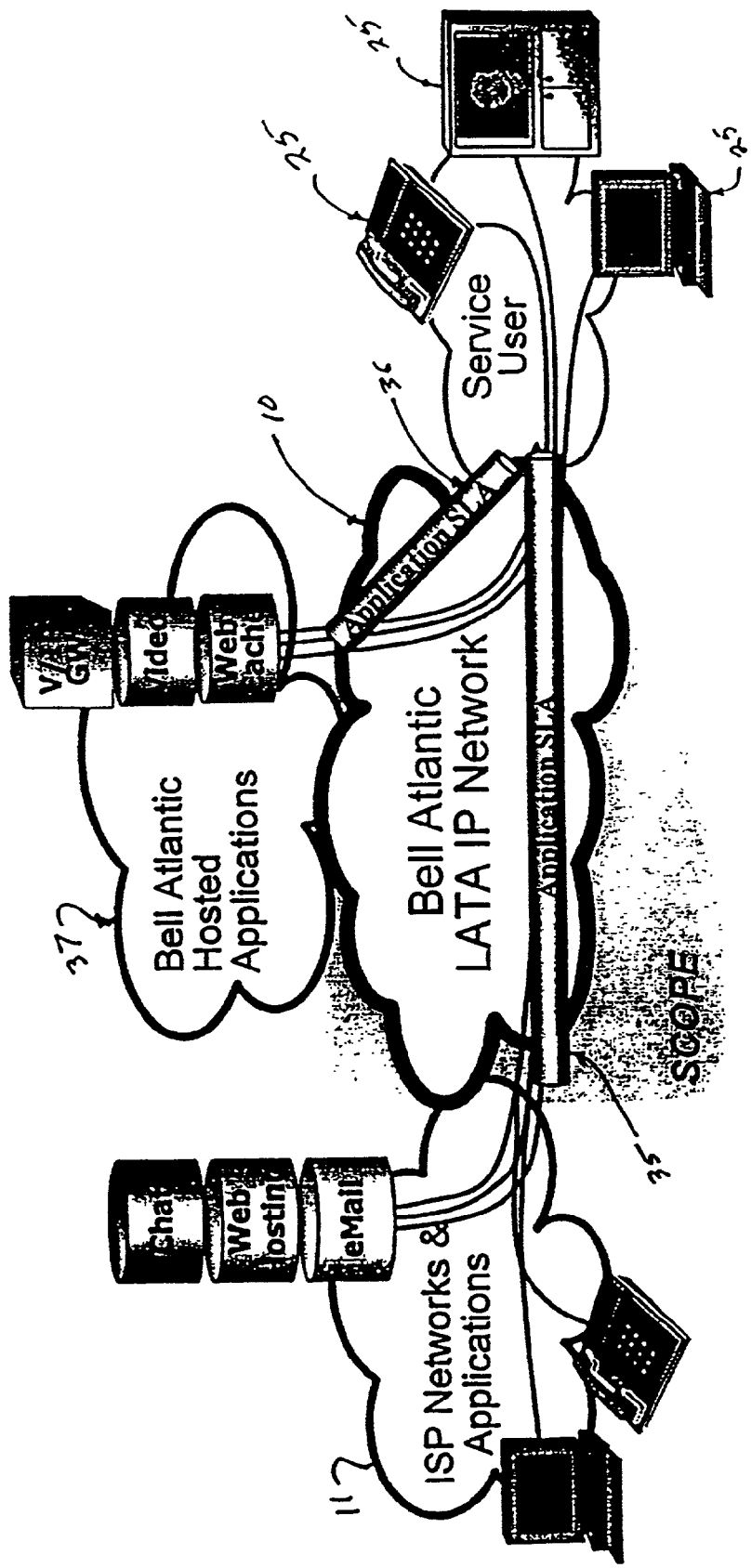
FIG. 3 is a functional block diagram of the network showing the service level agreements (SLAs) for which the network provides appropriate QoS.

FIG. 3 depicts the logical division of the subscriber's traffic, as implemented at the ATM switch 19 in accord with the invention. As shown, the network 10 provides a logical "pipe" or circuit 35 extending to the networks 11 of one or more of the ISPs, for an Internet access application. The ATM switch 19 (FIG. 1) preferably performs a rate shaping or control function. The leg 35 of the subscriber's traffic extending to the ISP 11 provides upstream and downstream communication rates conforming to a service level agreement (SLA) applicable to the subscriber's Internet access application. As such, the communications over the subscriber's logical circuit, extending from the switch to the ISP, provide a first level of QoS. To the subscriber, service over the leg 35 appears the same as a subscriber selected grade of Internet access service as provided by older ADN architectures. FIG. 3 illustrates chat rooms, web surfing and e-mail as examples of services an ISP might offer through the Internet Application SLA circuit 35 and the attendant portion of the subscriber's assigned logical circuit through the access network.

The network 10 also supports communications over one or more logical application paths 36 to local applications 37 hosted in the vertical services domain. Assuming that a subscriber with various equipment 25 also subscribes or otherwise participates in one or more of the vertical services, the local carrier (e.g. Verizon Communications in FIG. 3) offers a corresponding number of additional application SLAs with the customer. Each SLA for a vertical service may specify QoS parameters for the particular application, such as rate/bandwidth, latency, jitter, packet loss, packet sequence, security and/or availability. Examples of such applications hosted in the carrier's vertical services domain 37 include the illustrated voice over IP service shown as a V/IP gateway, as well as video services and some caching for high volume local web services. Communications for such applications utilize the one or more paths 36. The present invention also supports segregation and aggregation of traffic for three or more domains, based on the higher-level traffic type analysis.

A feature of the switch, in accord with the invention, is that it prioritizes traffic for each customer to support QoS for the various services as required by service level agreements (SLAs) between the customer and the carrier. In this regard, one implementation of the L3/4 ATM switch 19 performs queuing and tagging operations in accord with the desired prioritization. The switch will maintain two or more queues for each subscriber's permanent virtual circuit. The switch distinguishes the queues based on importance or priority. As the switch receives cell transmissions for transport over the virtual circuit to the customer premises, the switch will internally tag each cell as to its importance level and place each cell in the appropriate queue based on the tag.

The tagging and prioritization may be based on traffic type or 'Type of Service' (ToS). Table 1 illustrates one example of the possible ToS levels that may be assigned to different communications.

TABLE 1

| Relative Priority | ToS Value | AR Queuing | Customer Traffic Encapsulated ToS | Internal BA Mgmt Traffic Rewritten TOS |
|---|---|---|---|---|
| Critical Management | 0 | WFQ (Control 25%) | | OSPF, SNMP, ICMP, BGP |
| Future | 1 | | | |
| Real Time Interactive | 2 | WFQ (High 40%) | Port numbers identified | |
| IP Application Control | 3 | WFQ (Medium 30%) | ICMP, IGMP, EGP, DNS, H.323 signaling, BGP, SIP, Microsoft Media Player Streaming Media Control, RTSP | IGMP, RADIUS |
| One Way Streaming Media | 4 | | UDP (port 1024+) | |
| One Way Batch | 5 | | HTTP, HTTPS, SNMP, Telnet | |
| Unknown | 6 | WFQ (Low 5%) | Other | Other |
| Non time sensitive | 7 | | FTP, TFTP, SMTP | |

The access switch 19 will examine the content of each communication and determine an appropriate ToS level, for example in accord with the table above. Based on the ToS level, the switch will add a tag to the cell(s) as part of its internal processing. Using the ToS tags, the switch will place each of the cells for a given subscriber into a corresponding one of a plurality of queues that the switch maintains for the subscriber's traffic.

The switch may implement any one of a number of different queue servicing algorithms to select and transmit cells from the various queues. For example, the switch 19 may implement one of several statistical algorithms, equal queuing, weighted queuing, priority selection from queues, etc. The particular algorithm is selected to implement QoS in conformance with the subscriber's service level agreements (SLAs) with the carrier. In most cases, particularly for service applications from the vertical services domain, the switch 19 will not normally drop any cells or packets. In the rare event that the switch 19 becomes congested, any dropping of cells is based on the priority level assigned to the frame, i.e., lowest priority first. Also, if the switch ever drops cells, it drops all cells for an effected lowest priority frame from the relevant queue.

The ability to prioritize traffic across the vertically inserted streams and the wide area (typically Internet) stream enables the operator to control flows through the ADN 10 so that the local access facility is not overwhelmed with content which exceeds its physical (rate adaptive) limitations. For example, the queuing rules preferably ensure that the 'proper' applications (based on insertion device based rules) obtain access to the limited rate adaptive bandwidth available on any given subscriber's line. Also, the insertion point, switch 19, will usually sit behind the media conversion point (e.g., the DSLAM 17). An OC3 or other facility between the switch 19 and the DSLAM 17 also could become congested. Preferably, the switch 19 or other element at the insertion point queues the traffic in such a manner that no downstream facility (OC3) limitations (which are independent of the rate adaptive DSL loop limitations) will result in packets being dropped.

The queuing will be done based on customer and network provider determined rules so that contention for the facilities facing the subscriber will be addressed via the dropping of the appropriate packets. That way an inserted video stream doesn't overwhelm an Internet or Voice stream (due to facility limitations). Among others, appropriate industry understood methods for accomplishing this queuing control include Weighted Fair Queuing (WFQ), Priority (PQ) Queuing, and Weighted Random Early Discard (WRED).

Also, the ability of the switch 19 to examine higher level information provides other advantages in network operations. For example, the switch can implement sophisticated filters on the higher level information, e.g., to provide security. As another example, the switch preferably performs measuring and monitoring to determine what if any packets are dropped (based on the physical rate adaptive limitations), and generates appropriate reports to an external operations system (not shown).

The introduction of the L3/4 ATM switch 19 in proximity to the DSLAM(s) 17 also provides benefits in terms of operation of the gateway router 29. Due to the end-to-end use of the Unspecified Bit Rate (UBR) PVCs, the gateway router interface to the cell relay network 30 has been engineered to support a maximum of 2000–4000 PVCs (end users). This is essentially an over-provisioning of bandwidth that probabilistically avoids service degradation that could result from simultaneous demand for bandwidth. The ability of the L3/4 ATM switch 19 to perform QoS and rate shaping essentially reduces or ever removes this concern, because it significantly reduces the risk that the gateway router 29 will become a bottleneck. As a result, the ADN 10 can increase bandwidth efficiencies for this interface. Further, the capacity through the gateway router 29 need not be upgraded as often to support demand for increased bandwidth associated with new bandwidth-intensive services, since many such services are now introduced through the vertical services domain 13 and the L3/4 ATM switch 19.

Figure 4A:
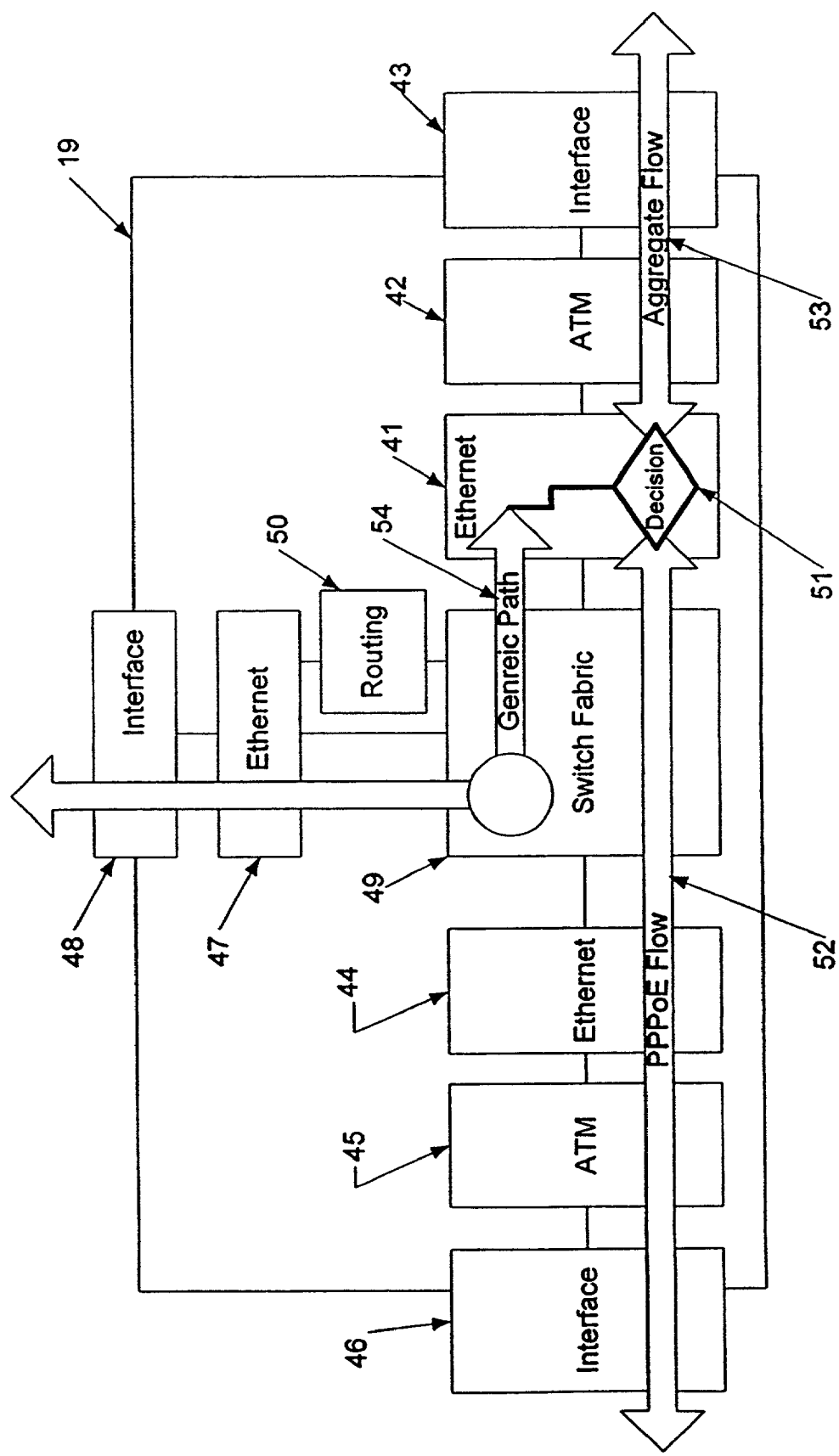
FIG. 4A is a logical diagram of the functional elements of an L3/4 switch, for use in the inventive network of FIGS. 1–3.

To fully understand an exemplary implementation of the various inventive concepts, it may be helpful to consider an ATM-based embodiment of the L3/4 switch 19. FIG. 4A is a block diagram of the elements and functions of such a preferred embodiment of the switch 19.

The preferred embodiments utilize Ethernet framing. As shown in the drawing, the switch 19 includes an Ethernet interface 41, an ATM interface 42 and an associated physical interface 43 facing toward the subscribers. In an embodiment for use in the network of FIGS. 1 and 2, the physical interface might take the form of one or more OC-3 or OC-12 links to the DSLAMs 17. These links carry all ATM cell traffic going to and from the DSLAMs and hence to and from the customer equipment served through the particular switch 19.

The switch 19 also includes an Ethernet interface 44, an ATM interface 45 and associated physical interface 46 facing toward the gateway router 29 and hence the ISPs 11. The physical interface 46 might take the form of one or more OC-12 or OC-48 links to the gateway router 29. These links carry all ATM cell traffic going to and from the ISPs or other wide area inter-networks 11. For these communications, the Ethernet interface 44 passes through PPPoE traffic, as specified by the Ethertype indicator in the cells transporting the relevant frame segments.

Facing the vertical services domain, the switch 19 includes an Ethernet interface 47 and a physical interface 48. These interfaces conform to the particular network utilized by the carrier for the vertical services domain, such as giga-bit Ethernet over wire or optical links.

The switch fabric 49 performs the physical switching of data along various paths through the switch 19, in response to instructions from a programmed routing controller 50. FIG. 4A also shows the communications flow through the switch, for each subscriber. The switch 19 also implements a Decision Point 51, shown for example within the Ethernet interface processing 41 on the subscriber facing side. At that point, the PPPoE traffic is separated from all other traffic. From that point, the PPPoE Flow 52 for each subscriber extends as a portion of the subscriber's ATM virtual circuit, facing the cell relay network and hence the ISPs 11. The PPPoE Flow 52 contains Ethernet frames that are of PPPoE Ethertype. Facing towards the subscriber premises, the switch 19 implements an Aggregate Flow path 53, in the form of another portion of the ATM virtual circuit, which contains all ingress/egress subscriber traffic. The switch implements a Generic Path 54 extending through the interfaces to the vertical services network. In the first embodiment, this path 54 carries all traffic other than PPPoE.

In this example, the switch 19 implements the Decision Point 51 based on recognition of the Ethertype indicator, which is above the layer-2 ATM cell routing information. However, the switch may implement the Decision Point 51 based on still higher-level protocol information. Also, those skilled in the art will recognize that the concepts of the present invention are applicable in networks using different protocol stacks, for example, based on native IP.

In a preferred embodiment, the Ethernet and ATM interfaces 41 and 42 and the Ethernet and ATM interfaces 44 and 45 implement segmentation and reassemble (SAR) functions, essentially providing two-way conversions between ATM cell format and Ethernet frame format. Segmentation involves dividing an Ethernet frame into a number of 48-byte blocks and adding ATM headers to the blocks to form a corresponding number of ATM cells. Any blocks that do not include a complete 48-byte payload are padded as necessary. Reassembly entails receiving and buffering ATM cells until it is recognized that a complete frame has been received. The ATM headers of the cells and any padding are stripped, and the payload data is reassembled into the form of an Ethernet frame.

In such an embodiment of the switch 19, the decision point 51 determines how to selectively forward the Ethernet frame information taken from a particular series of upstream ATM cells based on the Ethernet information taken from the ATM cell payloads, for example, by examining the frame header and recognizing the particular Ethertype indicator. Internally, the actual switch fabric 49 for such an embodiment of the switch 19 would comprise an Ethernet switch, even though to other elements of the ADN network 10 the switch 19 appears to perform an ATM switching function.

Those skilled in the art will recognize however, that the decision and switch fabric may be implemented in other ways. For example, a series of cells corresponding to an Ethernet frame could be buffered and the payloads examined just to recognize and identify the Ethertype indicator, without a complete reassemble of the Ethernet frame. This later implementation therefore could utilize an ATM cell-based switch fabric.

From the discussion above, it should already be apparent that certain aspects of the invention relate to setting up logical communication circuits at a relatively low protocol layer corresponding to switching or routing functions and then segregating traffic by distinguishing communication type using higher level protocol information. To insure full understanding on these points, it may be helpful to consider the protocol layer definitions, with particular reference to the illustration of the preferred layers in FIG. 2. The International Standards Organization (ISO) Open Systems Interconnection (OSI) reference model specifies a hierarchy of protocol layers and defines the function of each layer in the network.

The lowest layer defined by the OSI model is the physical layer (L1). This layer provides transmission of raw data bits over the physical communication channel through the particular network. For example, on the subscriber lines in the preferred embodiment, the physical layer (L1) uses ADSL. Within the customer premises, communications use an Ethernet physical layer (L1), such as 10Base-T. Upstream network elements may use DS3 at some points, but most use SONET, for example OC-3 or OC-12 physical layer transport. Attention is directed to the lower half of the diagram in FIG. 2, which depicts the various protocol stacks throughout the network 10.

The layer defined by the OSI model next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. In the network 10, the data link layer (L2) is used to define certain switching functions through the network. The network layer (L3) provides capabilities required to control connections between end systems through the network, e.g., set-up and tear-down of connections.

The preferred embodiments utilize ATM cell transport as the lowest element of the data link layer (L2), for example to define the connectivity extending from the ATU-Rs 23 through the ADN network 10 to the ISP or corporate networks 11. Subscriber virtual circuits are provisioned at the ATM cell layer, that is to say at the data link layer (L2).

Similarly ISP virtual circuits are provisioned at this ATM data link layer (L2), from the gateway router 29 through the cell relay network 30 to the ISP access concentrators 31. The ATM protocol therefore is the layer-2 (L2) protocol used to define the logical connectivity from the subscriber premises to the gateway router 29. The ATM protocol also is the layer-2 (L2) protocol used to define the logical connectivity from the gateway router 29 to the ISP concentrators 31.

For purposes of this discussion, higher level protocols are protocols that ride on or are encapsulated within the particular layer-2 protocol, that is to say in the payloads of the ATM cells in the preferred embodiment. Such higher level protocols include some protocols, which are often considered themselves to be level-2 protocols, where they are transported within ATM cells. The preferred embodiments use Ethernet, a local area network protocol above the ATM portion of the L2 layer. Technically, the Ethernet protocol may be considered as another L2 layer protocol. However, because it is segmented and encapsulated into the payloads of the ATM cells, the Ethernet protocol information actually is a higher level protocol information above the specific level-2 protocol (ATM) that defines the normal connectivity through the ADN network 10.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities. Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

In accord with one inventive concept, the network 10 actually utilizes two or more different types of protocol at levels above the protocol within the L2 layer that actually defines the network connectivity. The ADN network 10 may use different protocols at the higher layers as well. By distinguishing transmissions based on differences in these higher-level protocol types, the ATM switch 19 separately forwards different types of communication traffic for each subscriber. In the preferred embodiment, communications to and from the ISP or corporate networks 11 utilize point-to-point protocol (PPP) as the network layer (L3) protocol and a shim for transport of PPP over Ethernet (PPPoE). PPPoE, as one Ethertype protocol could also be considered as a second layer (L2) protocol albeit above the Ethernet layer itself, which in turn rides on the ATM cells used for routing at least through the permanent virtual circuit at the L2 layer.

In the illustrated implementation, however, the use of the PPPoE or a different protocol actually is an indication of a difference in type of the higher layer protocols. In the illustrated example of FIG. 2, the vertical services domain traffic utilizes Ethernet (802.3 SNAP) above the ATM adaptation layer (AAL). As noted, the presently preferred L3/4 switch 19 implements its routing decision based on recognition of the Ethertype indicator, that is to say to distinguish the PPPoE traffic from all other types of transmission from the customers' data equipment. In view of the use of ATM as the data link layer (L2) protocol of the network defining the lowest layer of network connectivity for communications services through the ADN network 10, the discrimination based on Ethernet actually implements a decision based on an effectively higher protocol layer.

IP protocol carries the actual higher-level applications information, for transport to and from the vertical services domain and for transport to and from the wide area internetwork. As such, IP and its related transport protocol referred to as the "Transmission Control Protocol" (TCP) ride on top of (are actually encapsulated within) the lower level protocol elements discussed above. Presentation and application layer elements ride on top of the IP layer. IP communication requires that each user device have an assigned IP address. IP addresses, however, are a scarce commodity. Because of the use of IP transport for both wide area services and vertical domain services, the network 10 actually may at times assign two different IP addresses to each active data communication device of an end-user, albeit on a temporary basis. The wide area communications and the vertical services network may also be viewed as two separate 'broadcast' domains.

First, the carrier operating the ADSL data network 10 and the vertical services domain network 13 will maintain a pool of local addresses for assignment, on an as-needed basis, to end user equipment 25. To the carrier, the available IP addresses are a limited resource. Accordingly, the carrier assigns IP addresses on a dynamic basis, only to those users actually on-line at any given time. The carrier preferably utilizes private network type IP addresses and dynamically administers such addresses using dynamic host configuration protocol (DHCP). DHCP is a protocol for automatic TCP/IP configuration, which enables dynamic address allocation and management.

When a particular device 25 becomes active via the ATU-R 23 and the DSLAM 17, it will activate a basic protocol stack, including an IP portion enabling communication with a DHCP server. The device will transmit an address request upstream through the network on the subscriber's virtual circuit. At the Ethernet level, this transmission appears as a broadcast message. The L3/4 ATM switch 19, however, will recognize that the packet is not a PPPoE communication and route the cells carrying the packet into the vertical services domain 13. Typically, a DHCP server is coupled to the vertical services domain network 13, for example as part of the carrier's administrative network or systems 33. The DHCP server somewhere on the vertical services domain 13, 33 will answer that broadcast request by selecting and providing an available one of the private IP addresses from the carrier's pool of available addresses. The message with the assigned address will go back to the L3/4 ATM switch 19 for insertion into the virtual circuit and transport back to the requesting device 25.

The particular end-user's device 25 uses the assigned private IP address as its source address, for all of its communications with the vertical services network 13, so long as it remains on-line for the present session. When the overall session ends and the end-user device 25 goes completely off-line, the DHCP server returns the private IP address to its pool of available addresses, for reassignment to another user as the next user comes on-line.

As noted, the user equipment 25 receives a private IP address from the DHCP server. The addresses of services on the vertical services domain also are private IP networks. Because these addresses are private, they are accessible only to equipment within that domain and the data network 10. Consequently, the devices are not accessible to hackers or the like coming in through the public Internet.

This dynamic assignment of IP addresses allows the carrier to limit the number of IP addresses used to the number of users actively connected through the ISP's host to the Internet. The use of private IP addresses allows the user equipment to communicate with the vertical services domain utilizing a normal IP-Ethernet protocol stack.

For the as-desired Internet access service, for example using a PPP or similar protocol, IP addresses are administered through the ISPs. The PPPoE protocol preserves or emulates the traditional dial-up approach to ISP access. However, the PPPoE approach does utilize Ethernet and follows Ethernet standards, for example, involving processing of certain broadcast messages.

The user can select an ISP of choice, and her data equipment 25 will initiate a selective session through the Ethernet layer on the network 10 to access the equipment 31 of the selected ISP network 11, in a manner directly analogous to a dial-up modem call through an ordinary telephone network. Hence at a time after initial activation through the networks 10 and 13, the user may activate a browser or other program for using the wide area internetwork service. This activates a second protocol stack, which includes the PPP protocol and the PPPoE shim. The user selects an ISP, and the data equipment initiates communication through the network 10 to the PPPoE equipment 31 of that ISP.

The IP addresses used by each ISP are public network type IP addresses. To the ISP, the pool of available public IP addresses also is a limited resource. Accordingly, each ISP prefers to assign IP addresses on a dynamic basis, only to those users actually on-line at any given time. Typically, as part of each initial access operation for a PPPoE session, the user's equipment 25 and the PPP terminating equipment 31 of the ISP conduct a handshaking, to establish data communications therebetween. As part of this operation, the user's device transmits a broadcast request for a public IP network. The broadcast message, in PPPoE goes through the virtual circuit to the gateway router 29 and through the router and cell relay network 30 to the ISPs PPPoE equipment 31. Although it is a broadcast message, the network effectively limits transport thereof to the virtual circuit going to the ISPs PPPoE equipment 31, that is to a domain separate from the vertical services network domain 13.

The ISP host equipment 31 initiates a procedure to assign the user's computer 25 a numeric Internet Protocol (IP) address from the pool of available public addresses and sends a PPPoE message containing that address back to the subscriber's device 25. When the session ends and the user goes off-line, the ISP host can reassign the address to another user, as the next user comes on-line.

This dynamic assignment of IP addresses allows the ISP to limit the number of public IP addresses used to the number of users actively connected through the ISP's host to the Internet. The end-user equipment will implement a second protocol stack, carrying PPPoE communications. The PPP protocol will allow the end-user equipment to obtain and utilize the public IP address for communications going to and from the public internetwork.

The switch 19 will limit transport of other types of PPPoE broadcast messages to the link to the PPPoE concentrator 31, in a manner similar to that described above for the PPPoE address request. The switch 19 also limits transport of non-PPPoE broadcast messages to the vertical services domain network 131, both for the address request message and for other types of broadcast requests. As such, the logical circuit to the PPPoE concentrator 31 becomes the conduit to one broadcast domain for upstream PPPoE messages; and the vertical services network 13 defines a second broadcast domain for upstream messages of other Ethertypes.

As noted, the end-user equipment 25 will implement two protocol stacks, a native stack without PPPoE and a second stack with PPPoE and a shim. In actual operation, both the native stack with other Ethernet protocols and the wide area stack with PPP and the PPPoE shim often will be active at the same time. The software in the data equipment 25 will utilize one stack or the other depending on whether the user selected a link, e.g. a URL, relating to the wide area internetwork or the vertical services domain. For example, a browser may display a page with embedded links. If a link is to a service on the vertical services domain, the embedded address will be a private address on the vertical services domain. Selection of such a link causes the device 25 to use the native Ethernet stack (without PPP or PPPoE) and the private address. Hence the L3/4 ATM switch 19 routes the request triggered by selection of the link to the vertical services domain 13. In contrast, if the link is to a service on the public Internet or other network 11, the embedded address will be a public IP address. Selection of such a link causes the end-user device 25 to use the PPP and PPPoE stack and the public address. Hence the L3/4 ATM switch 19 routes the request triggered by selection of the link over the virtual circuits to the PPPoE equipment 31 of the currently selected access provider network 11.

Services provided on the vertical services domain therefore appear as simple IP data services, albeit using the appropriate address space. Virtually any communication service provider may access the vertical services network 13 and through it the carrier's local customer base simply by providing an IP interface for coupling appropriate equipment to the vertical services network.

In addition to vertical services, the carrier continues to provide agreed access services to the equipment of the ISPs, in a manner analogous to current practices. For example, the carrier may provide its Internet access service to a subscriber on a monthly subscription basis, at one of several available rates corresponding to the grade of internet access service (and thus the rate of communication to/from the ISP) selected by the customer's subscription.

In an enhanced service offering, the broadcast provider could offer a convenient navigation interface from a web server. The server could be on the vertical services network, but preferably is on the wide area Internet 11. With a PPPoE session active, the user can surf to the provider's server and view information about available programming. The user might select a current broadcast program by 'clicking' on a URL link in the provider's web-based information. Although provided through the wide area Internet 11, the URL would actually contain the private IP address for the desired broadcast program available from the vertical services network 13. Selection of such a URL therefore would generate a message to the appropriate server on the vertical services network 11 to initiate the above discussed procedure to allow the user to 'join' the selected broadcast. A similar methodology might also enable a provider to offer menu, selection and order/billing services from the Internet 11, to provide pay-per-view or video on-demand type services from the vertical services domain network 13.

Figure 4B:
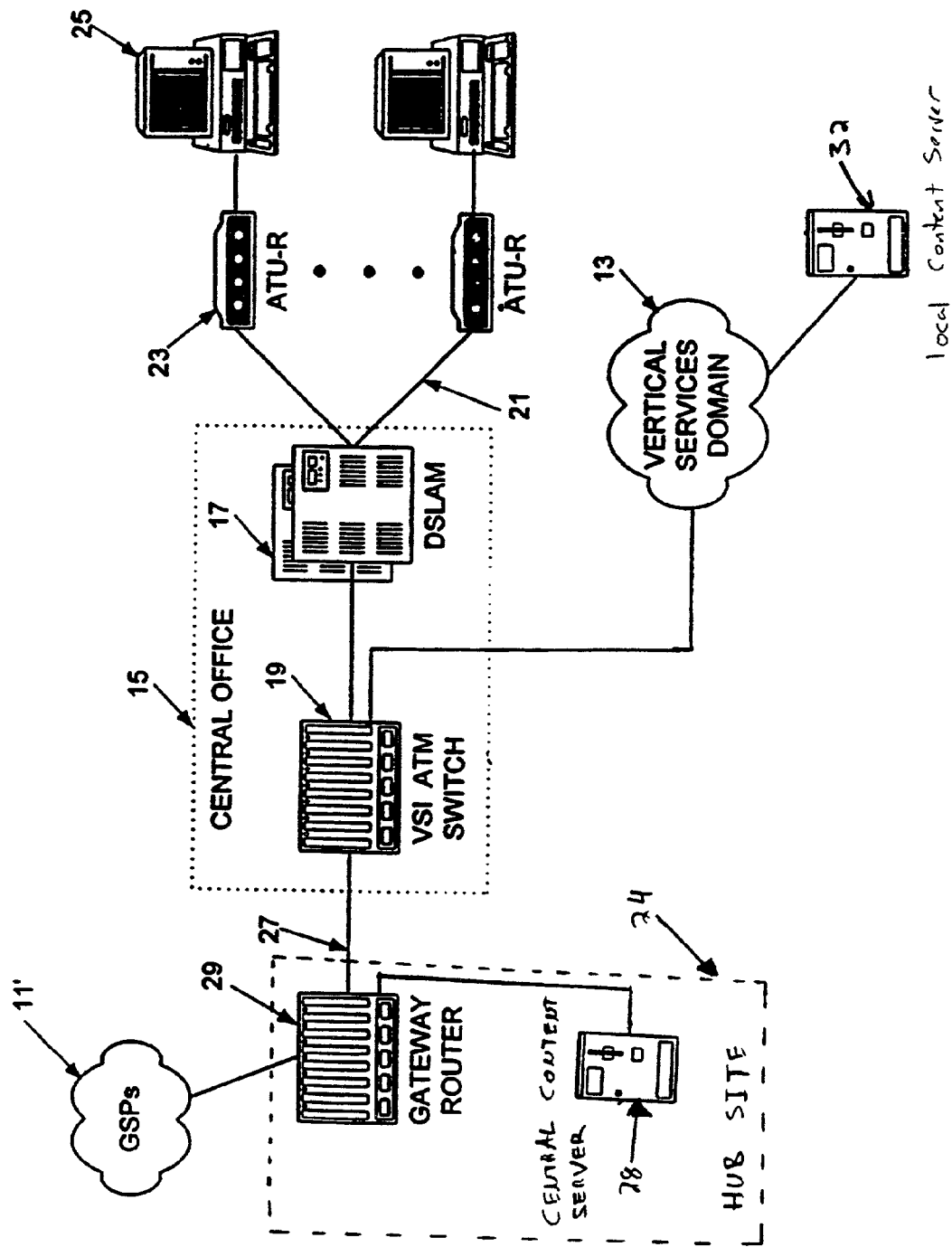
FIG. 4B is a functional block diagram of a digital subscriber line data network with a central content server proximate to the hub site and a local content server in the vertical services domain, proximate to the central office.

For on-demand content service, such as the downloading of movies, music, games, on-line books, and other bulk on-demand data, the content provider can store such data in a local content server 32 in the vertical services domain 13, as shown in FIG. 4B. In one embodiment, a user might download content stored on the local content server 32 by entering a URL or selecting a web-based link to the vertical services domain (without PPP or PPPoE) directing the download request to the local content server 32. As described above, the content will be transmitted to the end user through the VSI ATM switch 19, DSLAM 17, and ATU-R 23.

Certain aspects of the invention relate to distribution of content to or from such a server 32 in the vertical services domain. The content stored on the local content server 32 can, in one embodiment, be distributed to the local content server 32 from a hub site 24 separated from the central office 15 by a transmission line 27. It is often desirable to distribute content in this manner for many reasons. One such reason is that it is often desirable for content to be distributed or updated frequently. For example, if the content is a movie in a digital format and end users want the most recently released movies, the content on the local content server 32 must be updated often to include the most recently released movies in digital format. Another reason why it is desirable for content to be distributed through transmission line 27 is that such a distribution can be automatic and require minimal maintenance by a system administrator at the central office 15. One of ordinary skill in the art would recognize other advantages of distributing content from a central content server 28 to a number of dispersed local content servers 32.

Typically a hub site 24, housing the gateway router 29, services several remote central offices 15. The hub site 24 is a prime location for housing a central content server 28. The central content server 28 stores content that is to be distributed to the vertical service domains 13 of the respective central offices 15. Accordingly, a content provider can maintain the content stored on the central content server 28 and update the local content servers 32 located at the respective central offices 15 automatically and periodically. One of ordinary skill in the art would recognize other obvious locations for a central content server on a network.

One disadvantage of automatic updating of content on the local content servers 32 from the central content server 28, is that the bandwidth on transmission line 27 between the hub site 24 and the central office 15 is a limited resource. One of ordinary skill in the art would recognize that it is undesirable for content distribution to interfere or compromise the guaranteed transmission rate of subscriber traffic transmitted over transmission line 27. A solution to this problem, is a mechanism that determines unused bandwidth over transmission line 27 and only transmits content from the central content server 28 to the local content server 32 using bandwidth that is unused by subscriber traffic. It is desirable to distribute content from a central content server 28 to a local content server 32, but it is undesirable for such distribution to interfere with the quality of subscriber traffic. The mechanism described above only distributes content using unused bandwidth of transmission line 27 having the advantage of distributing content without interfering with the quality of subscriber traffic.

Figure 4C:
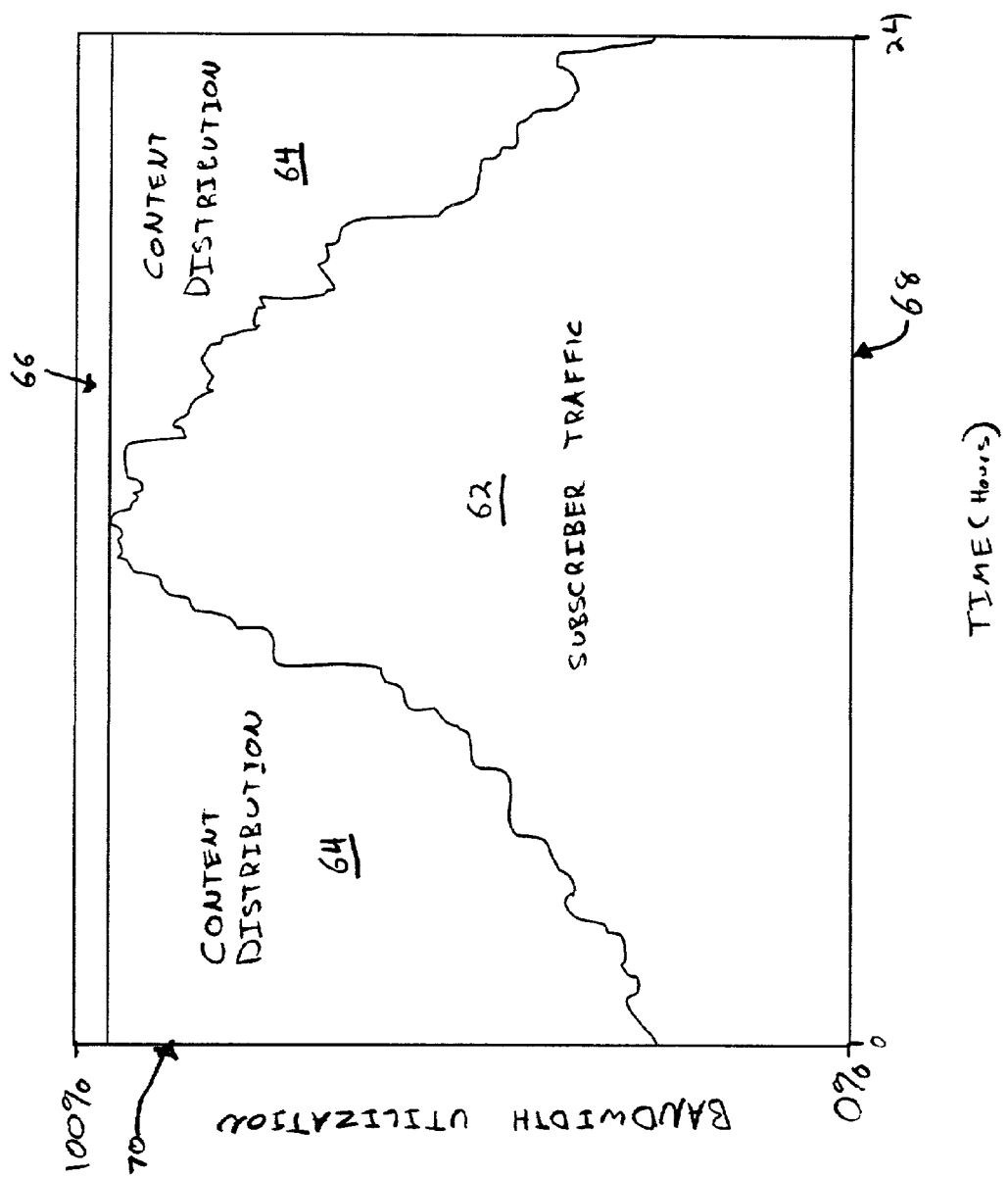
FIG. 4C is a bandwidth utilization graph illustrating content distribution over bandwidth unused by subscriber traffic, in accord with the invention.

FIG. 4C is an exemplary illustration of bandwidth utilization, in terms of time, for exemplary transmission line 27. On the y-axis 70, the bandwidth utilization is expressed from 0 to 100%. On the x-axis 68, time is expressed in the units of hours, from 0 to 24. As one of ordinary skill in the art would appreciate, the subscriber traffic 62 varies over time and at times is close to utilizing 100% of the bandwidth of transmission line 27. However, at other times subscriber traffic does utilize less than the entire bandwidth of transmission line 27. One aspect of the present invention includes a mechanism within the architecture of the hub site 24 and the central office 15 to monitor the bandwidth utilization of subscriber traffic 62. Using bandwidth utilization information, content distribution 64 can be implemented over bandwidth unused by subscriber traffic 62. Content distribution 64 fills up the bandwidth of transmission line 27 when subscriber traffic 62 utilizes less than 100% of the bandwidth of the transmission line 7.

It is important to note that region 66 of FIG. 4C is bandwidth reserved for content distribution. Normally this reserved bandwidth 66 is minimal and merely serves the purpose of maintaining sessions between the central content server 28 and local content servers 32 for content distribution 64. The "as-available" bandwidth may use up to the entire capacity of the link 27 when and if available; or the network may impose a maximum rate limit on the content distribution circuit, e.g., Mb/s.

The mechanism for distributing content from the central content server 28 to the local server 32 must utilize a congestion mechanism to prevent data loss and utilize unused bandwidth. One such congestion mechanism is Transmission Control Protocol (TCP). TCP employs a window based end-to-end congestion control mechanism to recover from segment loss and also avoid congestion collapse. In one exemplary embodiment, the central content server 28 is in communication with the gateway router 29 and the local content server 32 is in communication with the VSI ATM switch 19. This particular mechanism for distributing content from the central content server 28 to the local content server 32 is contained in the gateway router 29 and the VSI ATM switch 19, which are both ATM devices capable of prioritizing data transmission.

In one exemplary embodiment, a logical circuit is provisioned in the gateway router 29 and in the VSI ATM switch 19 for the download traffic between the servers 28 and 32. The provisioning for this logical circuit specifies a guaranteed minimum rate or bandwidth 66 for "keep-alive" purposes, so that the servers may maintain session communications. The provisioning for this logical circuit also provides an additional transport capacity on an "as available" service, to allow the circuit to access and utilize otherwise unutilized capacity. There may be a set maximum for this "as available" service, or the circuit may be allowed access up to the maximum otherwise unutilized capacity 64, at any given time, on the link 27 between the gateway router 29 and the VSI ATM switch 19. In this manner, the gateway router 29 and possibly the VSI ATM switch 19 will throttle the content transmissions from the server 28 to only consume otherwise available bandwidth as shown at 64.

In an initial implementation, the logical communication circuit between the servers 28 and 32 is an ATM Permanent Virtual Circuit (PVC) between the servers 28 and 32, that is to say extending through the gateway router 29 and the link 27 and at least to the access switch 19. The provisioning for this ATM circuit specifies the minimum rate or bandwidth 66 for "keep-alive" purposes and the "as available" capability to access additional bandwidth. In one embodiment, the ATM PVC circuit is provisioned as an Unspecified Bit Rate plus (UBR+) service between the gateway router 29 and the VSI ATM switch 19. The UBR+ service is essentially a low-priority unspecified bit rate service, with certain enhanced features, such as intelligent cell drop and early packet discard. Of note for purposes of discussion here, one of the enhanced features of UBR+ is that it may be provisioned with a minimum rate or service guarantee.

Those skilled in the art will recognize that different network implementations may utilize different mechanisms to control congestion and allocate some combination of guaranteed bandwidth and unspecified or as-available bandwidth for the circuit between the servers used for content distribution. For example, it would be possible to provision two circuits, one with low constant bit rate (CBR) service, the other with normal Unspecified Bit Rate (UBR) service. The servers, however, would be configured to treat the two ATM PVC circuits as one aggregate pipe. If router 29 supports QoS mechanisms of the type described above with respect to service control through the switch 19, another alternative is to utilize those mechanisms in the router 29 and/or the switch 19, to implement the desired combination of minimum guaranteed rate and as-available service for the content distribution circuit.

One skilled in the art would also recognize the content can be distributed from a local content server 32 to a central content server 28 in the same manner as discussed above. One example of when this is desirable, is when the content provider is an end user 25 served through central office 15. Such a content provider would upload content to the local content server 32 in the respective central office 15, and then the content would be distributed from the local content server 32 to the central content server 28. The central content server 28, in turn, re-distributes that content to other local content servers 32, at other remote central offices 15.

In one exemplary embodiment, the present invention is a software product for replicating content data from a server 28 at a hub site 24 to servers 32 at a respective central office 15. The software product comprises at least one machine readable medium and programming code carried by the at least one machine readable medium for execution by at least one computer. The programming code includes a congestion mechanism and a first transmitting mechanism. The congestion mechanism allows for the determination of unused bandwidth on a portion of a common link of a network over which the hub site and the central office communicate.

In one embodiment of the software product, the congestion mechanism is Transmission Control Protocol (TCP) utilized by servers 28 and 32. The congestion mechanism may also rely on UBR+ service or other capabilities through the switches as outlined above. The first transmitting mechanism causes the hub site server to transmit content to a second server, via the otherwise unused bandwidth, e.g. as TCP over UBR+ ATM transport.

The programming code may further comprise a second transmitting mechanism for causing transmission of content data stored at the central office, e.g. on server 32, to the customer. More particularly, the second transmitting mechanism may cause the transmission of the content data stored at the central office to a VSI ATM switch 19 at the central office 15. The second transmitting mechanism then causes the integration of the content data with other data being transmitting to the customer through the ATM switch 19 in the central office 15 to the customer equipment 25, essentially as described above relative to FIGS. 1 and 2. The second transmitting mechanism may cause the distribution of the integrated data to the customer through a multiplexer.

In one embodiment, the software product runs on a server and a gateway router within the hub site and/or the local server and VSI ATM switch of the central office. However, one of ordinary skill in the art would realize that the software product could run from other computer hardware devices within or proximate to the hub site and/or the gateway router. Alternate embodiments of the hub site are discussed later with respect to FIG. 7.

Table 2 summarizes the characteristics and requirements of a number of examples of the types of vertical services that the VSD network 13 can deliver via the L3/4 ATM switch 19 and the ADSL data network 10.

TABLE 2

| Vertical Service Offering | Characteristics of the Service | Network Requirements |
|---|---|---|
| Voice Services | Local Co-Located VoIP Gateways, VoIP, Unified messaging, IP PBX, IP Centrex | Low latency, low jitter, non-correlated packet loss, and high availability |
| Video On Demand (Unicast) | Local VOD Servers or access to centralized servers. Supports whatever model of server deployment/content delivery mechanism. | High bandwidth, low jitter, high availability, and low packet loss |
| Multimedia Broadcast (Multicast) | Broadcast Video; Broadcast Audio; Satellite Down Link support; Local Servers at the edge. | Varies with content type and with multicast implementation |
| Caching Services | Local servers as the insertion point, Local delivery mechanism for generic media objects such as web pages, images, video files, audio clips, software downloads, etc. | Layer 3/4 visibility |
| Distance Learning (EVC) | Integrated interactive video, voice and data | Low latency, low jitter, non-correlated packet loss, and high availability |
| Telecommuting | Closed user group with access to Transport LAN Service (TLS). | IEEE 802.1Q |

The above discussed preferred embodiments implemented the processing above the layer-2 protocol in an enhanced ATM switch and focused on implementation over an xDSL network specifically designed for use of twisted pair wiring to the customer premises. Those skilled in the art, however, will recognize that the principles of the present invention are equally applicable to other types of layer-1 and layer-2 transport/switching technologies as well as selection based on other protocols above the layer-2 connectivity protocol.

Figure 5:
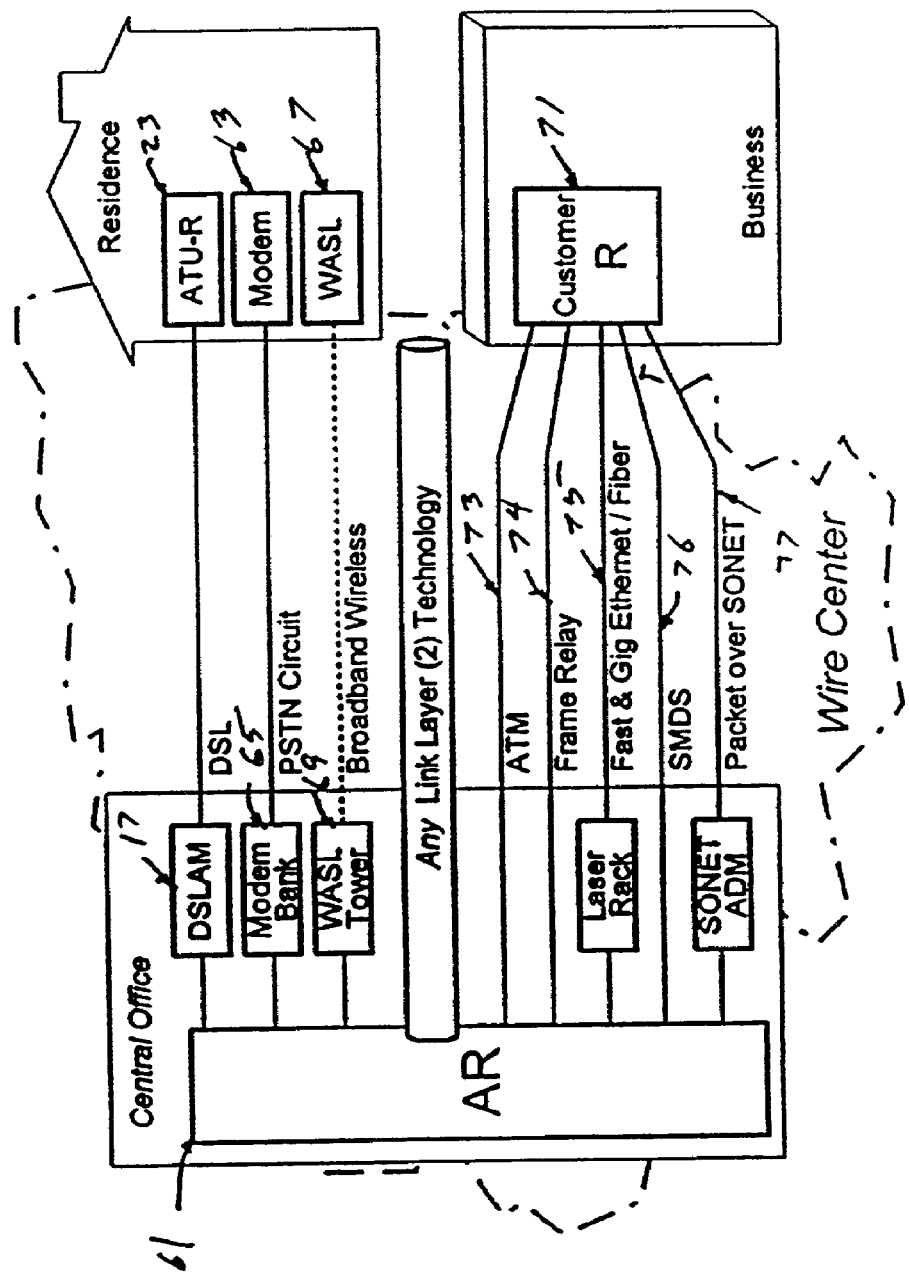
FIG. 5 is a block diagram of a modified portion of the network, useful in explaining migration to other types of physical transport and switching/routing protocols.

FIG. 5, illustrates the implementation of the layer 3/4 and higher switch functionality in a generic access router (AR) 61. The underlying protocol defining the lowest L2 layer switch connectivity may utilize ATM or other transport mechanisms, such as native Ethernet, frame relay, or native IP. The illustration also teaches the provision of digital subscriber line data communication between the access router (AR) 61 and a number of customer premises, using a variety of line technologies. The digital line technologies include dial-up modems 63, 65 as well as wireless communications between wireless asymmetrical subscriber loop (WASL) transceivers 67, 69. The access router (AR) 61 can service residential customers via these other communication technologies as well as through the DSLAM 17 and the ATU-R 23 as in the earlier embodiment. The access router (AR) 61 also serves business customer router equipment 71, using a variety of fast frame/cell packet technologies 73–76 and even optical fiber (SONET) 71.

Those skilled in the art will recognize that even these examples are limited. For example, the invention may apply to systems that have previously been considered as pure video networks, such as a hybrid fiber-coax implementation of a CATV system with digital video service as well as cable modem service.

The access router (AR) 61 will provide one or more types of logical circuits, implemented in the appropriate layer-2 protocol(s), e.g. ATM, frame relay, etc. Although the links to the wide area internetwork and the vertical services domain have been omitted here for simplicity of illustration, the access router (AR) 61 will provide the routing functions to and from the wide area internetwork and the vertical services domain in a manner similar to the functionality of the L3/4 ATM switch 19 in the earlier embodiment. In this regard, the access router (AR) 61 will support the QoS levels and will enable local insertion of vertical services.

Figure 6:
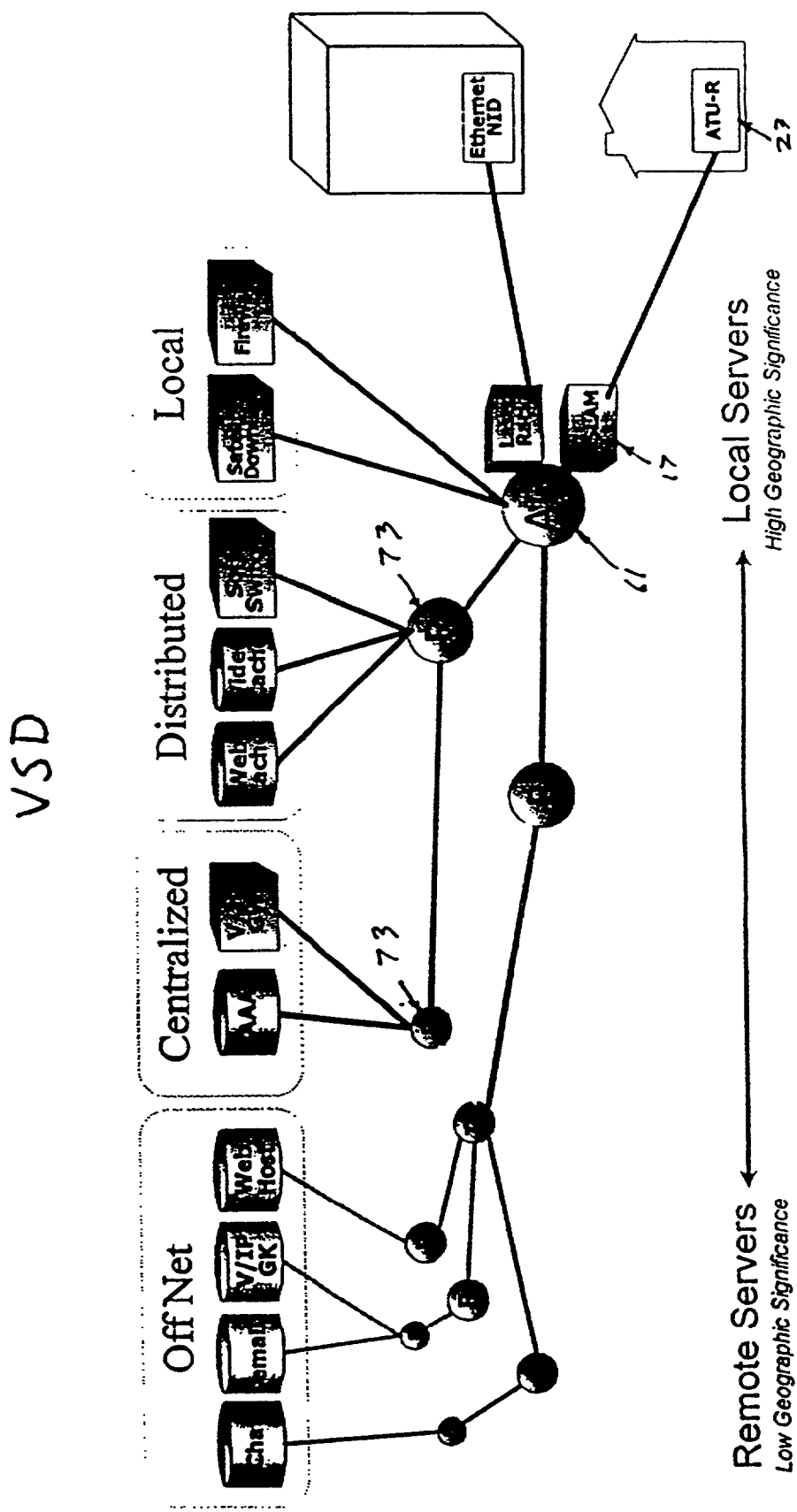
FIG. 6 is a block diagram of a portion of the network of FIG. 5, showing the interconnection thereof with the wide area network and the local vertical services domain.

FIG. 6 depicts a portion of the network of FIG. 5, showing the interconnection thereof with the wide area internetwork and the local vertical services domain. The vertical services network itself may include a number of routers (R) 73. Through that network, the access router (AR) 61 provides communications with services in the VSD that may be purely local, somewhat distributed or even centralized. True long distance data services, such as chat rooms, email and web browsing on the public Internet, however, are considered as Off-Net services, since they are accessed via the Internet access connection under the associated SLA.

Although the embodiments discussed to this point provide a single local vertical services domain and the public Internet domain through the ISPs or ISPs, the inventions encompass networks supporting even more distinct network domains. For example, the different Ethertype identifiers or other traffic type indicators can be used to segregate traffic into multiple domains at different points between the DSLAM and the gateway router. The PC or other CPE would determine which type to use, and a switch similar to the VSI switch 19 at the appropriate point along the PVC would segregate and aggregate the traffic according to Ethertype or the like. In addition, the distinctions can be based on still higher types of information from the protocol stack.

Figure 7:
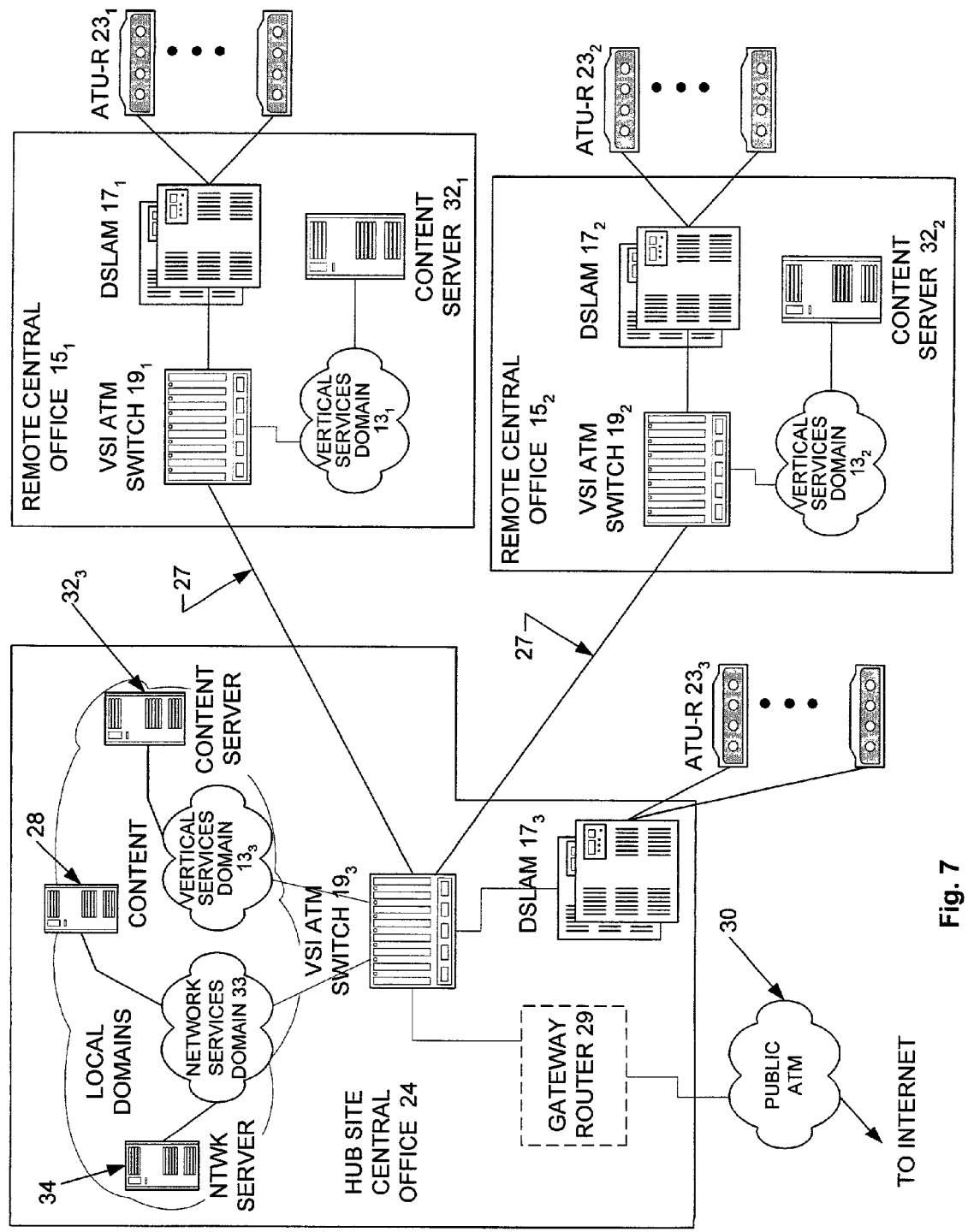
FIG. 7 is a block diagram of a modified embodiment of the network, useful in explaining certain preferred aspects of the content distribution in accord with the invention.

FIG. 7 illustrates a somewhat modified architecture of the ADN and may be helpful in understanding certain aspects and alternatives relating to the inventive content distribution as well as the implementation of more network domains. The drawing shows two central offices $15_1$ and $15_2$ and the hub site 24. It should be noted, however, that the hub 24 typically is located in a central office, as well. Each of these central offices includes one or more DLAMS 17, a VSI ATM switch 19 and a local vertical services domain network 13. In general, these elements provide Internet access and vertically inserted services through modems (ATU-Rs) 23 to customer premises equipment (not shown here for simplicity of illustration).

For example, the first remote central office $15_1$ includes one or more DLAMS $17_1$ and a VSI ATM switch $19_1$. The DSLAMS $17_1$ provide DSL communications to and from the customer premises modems $23_1$. The first remote central office $15_1$ also includes a local data network forming the first vertical services domain $13_1$. Data equipment for providing the vertically inserted services connects to the vertical services domain $13_1$. Of note for purposes of this discussion, the equipment connected to the vertical services domain $13_1$ includes a local content server $32_1$, for example for content downloading as might be used in an on-demand service or the like. Similarly, the second remote central office $15_2$ includes one or more DLAMS $17_2$ and a VSI ATM switch $19_2$. The DSLAMS $17_2$ provide DSL communications to and from the customer premises modems $23_2$. The first remote central office $15_2$ also includes a local data network forming the second vertical services domain $13_2$. Data equipment for providing the vertically inserted services, such as the local content server $32_2$, connects to the vertical services domain $13_2$.

These elements in the remote central offices $15_1$ and $15_2$ function essentially the same as in the earlier embodiments, to provide both Internet access services and vertically inserted services, including content distribution to customers. In particular, the VSI ATM switches $19_1$, $19_2$ forward upstream PPPoE traffic over the respective SONET links 27 to the hub office 24 and segregate upstream traffic of at least one other Ethertype and supply that traffic to the respective vertical services domain $13_1$, $13_2$. In the downstream direction, the VSI ATM switches $19_1$, $19_2$ aggregate traffic from the respective vertical services domain $13_1$, $13_2$ together with respective customers' Internet traffic in the virtual circuits, for communication via the DSLAMS $17_1$, $17_2$ and modems $23_1$, $23_2$ to the customer premises equipment.

As noted, the remote hub site 24 also is within the building of a central office. The hub office may provide tandem services, but in most cases, the hub office will also provide at least some end office services over subscriber links to customer premises. Accordingly, the office 24 also includes one or more DLAMS $17_3$ and a VSI ATM switch $19_3$. The DSLAMS $17_3$ provide DSL communications to and from the customer premises modems $23_3$. The hub office 24 also includes at least one and preferably two local network domains. The first of the local domains in the hub 24 is a local data network forming a third vertical services domain $13_3$. Data equipment for providing the vertically inserted services for example, including a content server $32_3$, connects to that vertical services domain $13_3$. In this embodiment, the content server $32_3$ provides local content distribution services to customer equipment coupled to the ATU-R modems $23_3$, in essentially the same manner as provided by the content servers 32 in the other offices 15. As discussed more later, a central content server 28 in the office 24 also provides distribution of content to/from the servers 32.

With respect to the locally served customers, for example receiving services via the ATU-R modems $23_3$, the elements $17_3$, $19_3$ and $13_3$ function essentially the same as in the earlier embodiments, to provide both Internet access services and vertically inserted services, including content distribution to those customers. In particular, the VSI ATM switch $19_3$ forwards upstream PPPoE traffic toward the Internet, and switch $19_3$ segregates upstream traffic of at least one other Ethertype and supplies that traffic to the vertical services domain $13_3$. In the downstream direction, the VSI ATM switch $19_3$ aggregates traffic from the vertical services domain $13_3$ together with the respective customers' Internet traffic in the virtual circuits, for communication via the DSLAMS $17_3$ and the modems $23_3$ to the customer premises equipment.

The hub office 24, however, also implements a number of centralized functions. As in the earlier embodiments, the hub office 24 provides the link to the Internet, for example, via a gateway router 29. The drawing shows the router in dotted line form, because the use of such router in this embodiment is optional and may no longer be necessary. Preferably, the VSI ATM switch $19_3$ implements the functions previously performed by the gateway router 29, in addition to the functions discussed above relative to the switches 19. To this end, the VSI ATM switch $19_3$ includes interface cards for trunk connections 27 going to/from the other switches $19_1$, $19_2$. The VSI ATM switch $19_3$ further includes one or more interface cards for trunk connection(s) to the public ATM network 30, which provides the links to the Internet service providers.

The hub office 24 also provides a convenient location to implement the network services domain 33 and provide associated network server(s) 34. The server 34, for example, may provide the above-discussed DHCP address administration for the ADN carrier's vertical services. The server 34 also may perform a variety of network operations in support of the ADN, such as automated provisioning, downloading of network related software to CPE devices, automated testing, etc. The central content distribution server 28 may connect to the vertical services domain $13_3$ in the hub 24; or as shown, that server 28 may connect to the network services domain.

The earlier embodiments supported two network domains, one for Internet services and the other for vertical services. The embodiment of FIG. 7 implements a traffic-type routing technique, as an extension of that used in the earlier embodiments, to implement even more distinct network domains. For example, different Ethertype identifiers can be used to segregate traffic into multiple domains at different points in the ADN. Specifically, the respective end offices implement PPPoE segregation of upstream traffic on the subscribers' logical circuits, for all traffic going to the Internet. The PC or other CPE uses a second Ethertype indicator in traffic destined for the vertical services domain 13 in the respective office 15 or 24. The VSI ATM switch 19 extracts upstream traffic of an appropriate second Ethertype from the logical circuits for the respective local subscribers and supplies that traffic to the network forming the vertical services domain 13 in the respective office.

The network of FIG. 7 utilizes a third Ethertype for traffic relating to the network services domain 33. The PC or other CPE uses the third Ethertype indicator in traffic destined for equipment in the network services domain 33, such as the network server 34. The VSI ATM switches $19_1$, $19_2$ in the remote central offices $15_1$, $15_2$, allow this traffic type to pass upstream over the trunk links 27 in the subscribers' logical circuits, together with the PPPoE traffic. The VSI ATM switches $19_3$, however, extracts upstream traffic of the third Ethertype from the logical circuits for the respective local subscribers and supplies that traffic to the network forming the network services domain 33 in the hub office. The switch $19_3$, performs this Ethertype recognition and traffic segregation both for upstream traffic received via the trunk links 27 and for traffic of the local subscribers coming over logical circuits from the ATU-R modems $23_3$. As noted earlier, the traffic type distinctions can be based on still higher types of information from the protocol stack.

The switch $19_3$ also aggregates downstream traffic from the network services domain 33 into the appropriate customers' logical circuits. The remote switches $19_1$, $19_2$ allow such traffic to pass downstream within the respective customers' logical circuits, in essentially the same manner as downstream traffic coming from the Internet.

In this manner, the network of FIG. 7 provides Internet access services, vertical services insertion and network services in a manner analogous to the earlier embodiments. Certain services, such as content distribution and network services, however, can be centralized to at least to some extent in the hub office 24. The use of a VSI ATM switch $19_3$ at the hub 24 also allows application of the prioritization and queuing for QoS, at the hub location.

The preferred embodiment shown in FIG. 7 offers certain advantages of particular note with respect to the inventive content distribution. In that embodiment, content is distributed among the servers 28, 32. The content may be uploaded from a server 32 to the central content server 28, but most often content is downloaded from the central server to one or more of the local content servers 32. For this purpose, the network of FIG. 7 provides at least one logical circuit between the central content server 28 and each of the local content servers $32_1$, $32_2$. The servers utilize a congestion mechanism to prevent data loss and utilize unused bandwidth, such as Transmission Control Protocol (TCP). Each logical circuit between two content servers preferably is provisioned to have a guaranteed minimum rate or bandwidth 66 for "keep-alive" purposes, as well as an additional "as available" transport capacity. There may be a set maximum for the "as available" service, or the circuit may be allowed access up to the maximum otherwise unutilized capacity 64, at any given time, on the link 27 between the switch $19_3$ and the VSI ATM switch $19_1$ or $19_2$ in the respective remote office 15 (see FIG. 4C).

In this regard, it may be helpful to discuss one specific example of such a circuit between content servers. For that purpose, consider the circuit between the central content server 28 in the hub site 24 and the first local content server $32_1$ in the remote central office $15_1$. The circuit may be an ATM permanent virtual circuit extending through the hub VSI ATM switch $19_3$, the appropriate interoffice link 27 and the first remote VSI ATM switch $19_1$. In one embodiment, the ATM PVC circuit is provisioned as an Unspecified Bit Rate plus (UBR+) service. The provisioning for this ATM circuit in the switches $19_1$, $19_3$ specifies the minimum "keep-alive" rate or bandwidth 66 and the "as available" capability parameters 64.

The embodiment of FIG. 7, however, also will support a preferred alternative implementation of the logical circuit between the central content server 28 and each of the local content servers $32_1$, $32_2$. In this later embodiment, the circuit again would extend through the hub VSI ATM switch $19_3$, the appropriate interoffice link 27 and the first remote VSI ATM switch $19_1$ and use an ATM PVC. However, the circuit is provisioned as a normal Unspecified Bit Rate, with no guaranteed minimum. Instead, the desired rate characteristics are implemented using the prioritization and queuing mechanisms developed for QoS and described earlier. At least the hub switch $19_3$ applies the QoS mechanisms to the communications between the servers in such as manner as to implement the desired available bandwidth service with a minimum guarantee for transmissions from the central server 28 to the remote server 32. If appropriate, the switch $19_1$ may provide similar bandwidth regulations using its QoS mechanisms, for transmissions from the content servers $32_1$ to the central server 28.

The use of the VSI ATM switch at the hub also provides another point for cell replication. For example, the switch $19_3$ can replicate cells for concurrent transmission to the remote switches $19_1$ and $19_2$. The switches $19_1$ and $19_2$ can supply such content to servers in the associated vertical services domains 13. Alternatively, the switches $19_1$ and $19_2$ can further replicate cells for transmission to currently "joined" customers of a broadcast service.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A method comprising:
determining unused bandwidth on a common link of an access data network carrying subscriber traffic and over which a central content server located in a hub site and an at least one local content server located in a central office communicate;

transmitting content data stored on the central content server to the at least one local content server substantially on the determined unused bandwidth;

storing the content data transmitted to the at least one local content server on the at least one local content server; and transmitting the content data stored on the at least one local content server to at least one end user terminal proximate to the at least one local content server;

wherein the step of transmitting the content data stored on the at least one local content server to the at least one end user terminal proximate to the at least one local content server comprises the steps of:

provisioning a logical communication circuit extending from the at least one end user terminal through the network to a communication access node coupled to a first network domain, at least a portion of the logical communication circuit extending through the common link, wherein the provisioning comprises defining the logical communication circuit in terms of a layer-2 protocol defining switched connectivity through the network;

at a data switch, examining communicated information in transmissions from the at least one end user terminal, for a protocol encapsulated within said layer-2 protocol, to distinguish transmission types;

forwarding each detected transmission of a first transmission type from the data switch to the communication access node over the logical communication circuit defined in terms of the layer-2 protocol; and forwarding each detected transmission of a second type, different from the first transmission type, to a second network domain logically separate from the first network domain, wherein the at least one local content server is coupled to the second network domain to receive at least one transmission of the second type for control of the step of transmitting the content data stored on the at least one local content server to the at least one end user terminal proximate to the at least one local content server.

2. The method as in claim 1, further comprising the steps of:

receiving first downstream transmissions intended for the at least one end user terminal at the data switch, over the logical communication circuit from the first network domain;

receiving second downstream transmissions intended for the at least one end user terminal from the second network domain at the data switch; and inserting the second downstream transmissions into the logical communication circuit, to combine the first and second downstream transmissions for communication over the logical communication circuit from the data switch to the at least one end user terminal.

3. The method as in claim 2, wherein the logical communication circuit comprises an asynchronous transfer mode (ATM) permanent virtual circuit (PVC).

4. The method of claim 1, wherein a part of the bandwidth of the common link is reserved for transmitting the content data stored on the central content server to the at least one local content server to prevent the loss of a session between the central content server and the at least one local content server.

5. The method of claim 1, wherein the steps of determining unused bandwidth and transmitting the content data utilize priority and queuing in at least one node of the access data network, to implement a minimum bandwidth and provide additional bandwidth as available on the common link, for the transmitting of the content data over the common link.

6. The method of claim 1, wherein the steps of determining unused bandwidth and transmitting the content data implement a congestion mechanism to prevent data loss and utilize unused bandwidth.

7. The method of claim 6, wherein the congestion mechanism comprises Transmission Control Protocol (TCP).

8. The method of claim 1, wherein the transmitting step utilizes an unspecified bit rate service through the common link.

9. The method of claim 1, wherein the common link of the network also carries logical circuits for wide area data communications of a plurality end user terminals.

10. An access data network, for providing access services to at least two different network domains, comprising:
  a communication access node coupled to a first network domain;
  a central content server located at a hub site for storing content data coupled to the communication access node;
  a plurality of digital subscriber line transceivers coupled to network ends of subscriber lines, for data communication with transceivers coupled to customer premises end of respective subscriber lines;
  an access switch coupled for data communication with the digital subscriber line transceivers, for receiving data from customer premises equipment via respective ones of the digital subscriber line transceivers and for supplying data intended for transmission to predetermined customer premises equipment to the respective ones of the digital subscriber line transceivers;
  a high-speed data link between the access switch and the communication access node;
  a layer-2 protocol logical communication circuit provisioned through the access switch and the high-speed data link for each subscriber line, wherein the layer-2 protocol logical communication circuit is provisioned to extend from a respective customer premises to the communication access node;
  a second network domain coupled locally to the access switch;
  a local content server located in a central office for storing the content data coupled to the second network domain; and
  a logical communication circuit for content distribution between the central content server and the local content server provisioned through the access switch and the high-speed data link, the provisioning of the logical communication circuit for content distribution enabling communication of the content data between the communication access node and the access switch over bandwidth unused by traffic on the layer-2 protocol logical communication circuits.

11. The access data network as in claim 10, further comprising:
  a controller associated with the access switch, for examining communicated information in transmissions from the respective customer premises, for a protocol encapsulated within said layer-2 protocol, to distinguish transmission types, and in response to cause the switch to:
    forward each detected transmission of a first transmission type to the communication access node over a respective one of the logical communication circuits defined in terms of the layer-2 protocol;
    receive first downstream transmissions intended for one customer premises from the communication access node, over the respective logical communication circuit;
    receive second downstream transmissions intended for the one customer premises from the second network domain, wherein the content stored on the local content server is transmitted to the one customer premises over at least some of the second downstream transmissions; and
    insert the second downstream transmissions into the respective one of the logical communication circuits, to combine the first and second downstream transmissions for transport via one of the digital subscriber line transceivers which serves the one customer premises.

12. The access data network as in claim 11, wherein each of the logical communication circuits comprises an Asynchronous Transfer Mode (ATM) permanent virtual circuit (PVC).

13. The access data network as in claim 11, wherein said controller comprises means for distinguishing between types of local area network protocol transmissions encapsulated within said layer-2 protocol.

14. The access data network as in claim 13, wherein the first transmission type comprises a type of the local area network protocol adapted for internetwork service provider applications.

15. The access network as in claim 14, wherein:
  the local area network protocol comprises an Ethernet protocol, and
  the first transmission type comprises point-to-point protocol over Ethernet.

16. The access data network as in claim 10, wherein the access switch comprises a router.

17. The access data network as in claim 10, wherein the access switch comprises a router.

18. The access data network as in claim 10, wherein each of the logical communication circuits comprises a virtual circuit.

19. The access data network as in claim 10, wherein the access switch comprises an Asynchronous Transfer Mode (ATM) switch.

20. The access data network as in claim 10, wherein:
  the digital subscriber line transceivers comprise asymmetrical digital subscriber line (ADSL) terminal units (ATUs);
  the network further comprises a multiplexer providing data communications coupling between the ATUs and the access switch; and
  the ATUs together with the multiplexer form a digital subscriber line access multiplexer (DSLAM).

21. The access data network as in claim 10, wherein at least one of the digital subscriber line transceivers is adapted for communication over an optical link.

22. The access data network as in claim 10, wherein at least one of the digital subscriber line transceivers is adapted for communications over a wireless link.

23. The access data network as in claim 10, wherein at least one of the digital subscriber line transceivers is adapted for communication over a telephone line.

24. A method of replicating content data stored on a central content server to at least one local content server, comprising the steps of:

determining unused bandwidth on a common link of an access data network carrying subscriber traffic and over which the central content server and the at least one local content server communicate;

transmitting content data stored on the central content server to the at least one local content server substantially on the determined unused bandwidth;

storing the content data transmitted to the at least one local content server on the at least one local content server;

transmitting the content data stored on the at least one local content server to at least one end user terminal proximate to the at least one local content server, wherein the step of transmitting the content data stored on the at least one local content server to the at least one end user terminal proximate to the at least one local content server comprises the steps of:

provisioning a logical communication circuit extending from the at least one end user terminal through the network to a communication access node coupled to a first network domain, at least a portion of the logical communication circuit extending through the common link, wherein the provisioning comprises defining the logical communication circuit in terms of a layer-2 protocol defining switched connectivity through the network;

at the data switch, examining communicated information in transmissions from the at least one end user terminal, for a protocol encapsulated within said layer-2 protocol, to distinguish transmission types;

forwarding each detected transmission of a first transmission type from the data switch to the communication access node over the logical communication circuit defined in terms of the layer-2 protocol; and forwarding each detected transmission of a second type, different from the first transmission type, to a second network domain logically separate from the first network domain, wherein the at least one local content server is coupled to the second network domain to receive at least one transmission of the second type for control of the step of transmitting the content data stored on the at least one local content server to at least one end user terminal proximate to the at least one local content server, and receiving first downstream transmissions intended for the at least one end user terminal at the data switch, over the logical communication circuit from the first network domain;

receiving second downstream transmissions intended for the at least one end user terminal from the second network domain at the data switch; and inserting the second downstream transmissions into the logical communication circuit, to combine the first and second downstream transmissions for communication over the logical communication circuit from the data switch to the at least one end user terminal.

25. The method as in claim 24, wherein the logical communication circuit comprises an asynchronous transfer mode (ATM) permanent virtual circuit (PVC).

26. An access data network, for providing access services to at least two different network domains, comprising:

a communication access node coupled to a first network domain;

a central content server for storing content data coupled to the communication access node;

a plurality of digital subscriber line transceivers coupled to network ends of subscriber lines, for data communication with transceivers coupled to customer premises end of respective subscriber lines;

an access switch coupled for data communication with the digital subscriber line transceivers, for receiving data from customer premises equipment via respective ones of the digital subscriber line transceivers and for supplying data intended for transmission to predetermined customer premises equipment to the respective ones of the digital subscriber line transceivers;

a high-speed data link between the access switch and the communication access node;

a layer-2 protocol logical communication circuit provisioned through the access switch and the high-speed data link for each subscriber line, wherein the layer-2 protocol logical communication circuit is provisioned to extend from a respective customer premises to the communication access node;

a second network domain coupled locally to the access switch;

a local content server for storing content data coupled to the second network domain;

a logical communication circuit for content distribution between the central content server and the local content server provisioned through the access switch and the high-speed data link, the provisioning of the logical communication circuit for the content distribution enabling communication of the content data between the communication access node and the access switch over bandwidth unused by traffic on the layer-2 protocol logical communication circuits;

a controller associated with the access switch, for examining communicated in transmissions from the respective customer premises, for a protocol encapsulated within said layer-2 protocol, to distinguish transmission types, and in response to cause the switch to:

forward each detected transmission of a first transmission type to the communication access node over a respective one of the logical communication circuits defined in terms of the layer-2 protocol;

forward each detected transmission of a second type, different from the first transmission type, to the second network domain;

receive first downstream transmissions intended for one customer premises from the communication access node, over the respective logical communication circuit;

receive second downstream transmissions intended for the one customer premises from the second network domain, wherein the content stored on the local content server is transmitted to the one customer premises over at least some of the second downstream transmissions; and insert the second downstream transmissions into the respective logical communication circuit, to combine the first and second downstream transmissions for transport via one of the digital subscriber line transceivers which serves the one customer premises.

27. The access data network as in claim 26, wherein each of the logical communication circuits comprises an Asynchronous Transfer Mode (ATM) permanent virtual circuit (PVC).

28. The access data network as in claim 26, wherein said controller comprises means for distinguishing between types of local area network protocol transmissions encapsulated within said layer-2 protocol.

29. An access data network, for providing access services to at least two different network domains, comprising:

a communication access node coupled to a first network domain;

a central content server for storing content data coupled to the communication access node;

a plurality of digital subscriber line transceivers coupled to network ends of subscriber lines, for data communication with transceivers coupled to customer premises end of respective subscriber lines;

an access switch coupled for data communication with the digital subscriber line transceivers, for receiving data from customer premises equipment via respective ones of the digital subscriber line transceivers and for supplying data intended for transmission to predetermined customer premises equipment to the respective ones of the digital subscriber line transceivers;

a high-speed data link between the access switch and the communication access node;

a layer-2 protocol logical communication circuit provisioned through the access switch and the high-speed data link for each subscriber line, wherein each logical communication circuit is provisioned to extend from a respective customer premises to the communication access node;

a second network domain coupled locally to the access switch;

a local content server for storing the content data coupled to the second network domain; and a logical communication circuit for content distribution between the central content server and the local content server provisioned through the access switch and the high-speed data link, the provisioning of the logical communication circuit for content distribution enabling communication of the content data between the communication access node and the access switch over bandwidth unused by traffic on the layer-2 protocol logical communication circuits, wherein the first transmission type comprises a type of a local area network protocol adapted for internetwork service provider applications.

30. The access network as in claim 29, wherein:

the local area network protocol comprises an Ethernet protocol, and the first transmission type comprises point-to-point protocol over Ethernet.

31. An access data network, for providing access services to at least two different network domains, comprising:

a communication access node coupled to a first network domain;

a central content server for storing content data coupled to the communication access node;

a plurality of digital subscriber line transceivers coupled to network ends of subscriber lines, for data communication with transceivers coupled to customer premises end of respective subscriber lines;

an access switch coupled for data communication with the digital subscriber line transceivers, for receiving data from customer premises equipment via respective ones of the digital subscriber line transceivers and for supplying data intended for transmission to predetermined customer premises equipment to the respective ones of the digital subscriber line transceivers;

a high-speed data link between the access switch and the communication access node;

a layer-2 protocol logical communication circuit provisioned through the access switch and the high-speed data link for each subscriber line, wherein each logical communication circuit is provisioned to extend from a respective customer premises to the communication access node;

a second network domain coupled locally to the access switch;

a local content server for storing content data coupled to the second network domain; and a logical communication circuit for content distribution between the central content server and the local content server provisioned through the access switch and the high-speed data link, the provisioning of the logical communication circuit for the content distribution enabling communication of the content data between the communication access node and the access switch over bandwidth unused by traffic on the layer-2 protocol logical communication circuits, wherein each provisioning of the logical communication circuit for the content distribution assigns unspecified bit rate service thereto with an associated minimum service guarantee.

32. An access data network, for providing a combination of wide area internetwork access service and vertical communication services, comprising:

a hub data switch connected to a coupling to the wide area internetwork;

a central content server coupled for data communication via the hub data switch;

a plurality of digital subscriber line transceivers coupled to network ends of subscriber lines, for data communication with transceivers coupled to customer premises ends of respective subscriber lines;

a multiplexer coupled to the digital subscriber line transceivers, for receiving data from customer premises equipment via respective ones of the digital subscriber line transceivers and for supplying data intended for transmission to predetermined customer premises equipment to the respective ones of the digital subscriber line transceivers;

an access switch coupled to the multiplexer;

a high-speed data link between the access switch and the hub data switch;

a vertical services network coupled locally to the access switch;

a local content server coupled for data communications via the vertical service network; and a logical circuit between the central content server and the local content server for transport of content data between the servers, wherein provisioning associated with the logical circuit in the hub data switch or in the access switch allocates otherwise available bandwidth to the logical circuit within the high-speed data link between the access switch and the hub data switch when not otherwise used by customer traffic, wherein the logical circuit comprises at least one Asynchronous Transfer Mode (ATM) permanent virtual circuit (PVC), wherein the at least one ATM PVC is provisioned to provide a guaranteed minimum bandwidth in combination with unspecified bit rate service for the logical circuit within the high-speed data link.

33. An access data network, for providing a combination of wide area internetwork access service and vertical communication services, comprising:

a hub data switch connected to a coupling to the wide area internetwork;

a central content server coupled for data communication via the hub data switch;

a plurality of digital subscriber line transceivers coupled to network ends of subscriber lines, for data communication with transceivers coupled to customer premises ends of respective subscriber lines;

a multiplexer coupled to the digital subscriber line transceivers, for receiving data from customer premises equipment via respective ones of the digital subscriber line transceivers and for supplying data intended for transmission to predetermined customer premises equipment to the respective ones of the digital subscriber line transceivers;

an access switch coupled to the multiplexer;

a high-speed data link between the access switch and the hub data switch;

a vertical services network coupled locally to the access switch;

a local content server coupled for data communications via the vertical service network;

a logical circuit between the central content server and the local content server for transport of content data between the servers, wherein provisioning associated with the logical circuit in the hub data switch or in the access switch allocates otherwise available bandwidth to the logical circuit within the high-speed data link between the access switch and the hub data switch when not otherwise used by customer traffic;

a respective subscriber logical communication circuit provisioned in terms of a layer-2 routing protocol through the access switch and the high-speed data link, for each subscriber line to the subscriber to the hub data switch;

means associated with the access switch for examining communicated information in transmissions on the respective subscriber logical communication circuit from each respective customer premises, for protocol layers higher than the layer-2 routing protocol, to distinguish transmission types;

wherein:

the access switch routes each detected transmission of a first transmission type, received from a customer premises via the respective subscriber logical communication circuit on the respective line, over the respective subscriber logical communication circuit on the high-speed data link to the hub data switch, and the access switch extracts each detected transmission of a type other than the first transmission type from the respective logical communication circuit for routing to the vertical services network.

* * * * *

UNITED STATES PATENT AND TRADEMARK OFFICE
CERTIFICATE OF CORRECTION

| | | |
|---|---|---|
| PATENT NO. | : 7,170,905 B1 | Page 1 of 1 |
| APPLICATION NO. | : 09/835649 | |
| DATED | : January 30, 2007 | |
| INVENTOR(S) | : Robert T. Baum et al. | |

It is certified that error appears in the above-identified patent and that said Letters Patent is hereby corrected as shown below:

In column 27, line 18, in Table 2, after "local servers" replace "as" with --at.--

In column 27, line 28, in Table 2, after "access to" replace "Transport" with --Transparent.--

Signed and Sealed this

Nineteenth Day of October, 2010

David J. Kappos
*Director of the United States Patent and Trademark Office*